(12) United States Patent
Sakata et al.

(10) Patent No.: US 7,993,576 B2
(45) Date of Patent: Aug. 9, 2011

(54) SINTERED BODY AND METHOD FOR PRODUCING THE SAME

(75) Inventors: Masaaki Sakata, Hachinohe (JP); Nobuyuki Hamakura, Hachinohe (JP)

(73) Assignee: Seiko Epson Corporation (JP)

( * ) Notice: Subject to any disclaimer, the term of this patent is extended or adjusted under 35 U.S.C. 154(b) by 594 days.

(21) Appl. No.: 12/048,700

(22) Filed: Mar. 14, 2008

(65) Prior Publication Data

US 2008/0226489 A1    Sep. 18, 2008

(30) Foreign Application Priority Data

Mar. 15, 2007    (JP) .................................. 2007-067662

(51) Int. Cl.
*B22F 3/12*    (2006.01)
*B22F 3/20*    (2006.01)
*B28B 1/24*    (2006.01)

(52) U.S. Cl. .............. 419/37; 419/38; 419/41; 264/652; 264/656; 264/669

(58) Field of Classification Search .................... 419/35, 419/36; 75/228
See application file for complete search history.

(56) References Cited

U.S. PATENT DOCUMENTS

| | | | | |
|---|---|---|---|---|
| 5,766,394 A * | 6/1998 | Anderson et al. | .......... | 156/89.11 |
| 6,204,316 B1 * | 3/2001 | Schofalvi | .................. | 524/198 |
| 6,224,990 B1 * | 5/2001 | Hahn et al. | .................. | 428/553 |
| 6,669,898 B2 * | 12/2003 | Gressel et al. | ................. | 419/36 |
| 7,163,569 B2 | 1/2007 | Toyoshima et al. | | |
| 7,241,416 B2 * | 7/2007 | Sweetland | ........................ | 419/8 |
| 2003/0062660 A1 * | 4/2003 | Beard et al. | .................... | 264/645 |
| 2003/0063993 A1 * | 4/2003 | Reiter et al. | .................... | 419/36 |
| 2003/0220424 A1 * | 11/2003 | Schofalvi et al. | ............ | 524/195 |
| 2007/0014682 A1 * | 1/2007 | Hariharan et al. | .............. | 419/36 |

FOREIGN PATENT DOCUMENTS

| | | |
|---|---|---|
| JP | 53-106712 | 9/1978 |
| JP | 03-170624 | 7/1991 |
| JP | 05-306162 | 11/1993 |
| JP | 10-008104 | 1/1998 |
| JP | 2005-154847 | 6/2005 |
| JP | 2006-265660 | 10/2006 |

* cited by examiner

*Primary Examiner* — Roy King
*Assistant Examiner* — Ngoclan T Mai
(74) *Attorney, Agent, or Firm* — Harness, Dickey & Pierce, P.L.C.

(57) ABSTRACT

A method for producing a sintered body includes: a) molding a composition containing a powder primarily made of an inorganic material and a binder including an aliphatic carbonic acid ester based resin in a predetermined shape so as to obtain a compact; b) exposing the compact to a first atmosphere containing an alkaline gas and thus decomposing and removing the aliphatic carbonic acid ester based resin from the compact so as to obtain a degreased body; and c) sintering the degreased body so as to obtain a sintered body.

17 Claims, 7 Drawing Sheets

SINTERED BODY AND METHOD FOR PRODUCING THE SAME

BACKGROUND

1. Technical Field

The present invention relates to a sintered body and a method for producing a sintered body.

2. Related Art

In general, a sintered body made of an inorganic material is obtained as follows: a compact is formed from a raw powder (mixed powder) that is an admixture of an inorganic material powder and a binder by using various forming methods such as an injection molding method; after the compact is degreased at a temperature that is higher than a melting temperature of the binder and lower than a sintering temperature for the inorganic material so as to obtain a degreased body; and the degreased body obtained is sintered.

However, for example, the raw powder used in the injection molding method includes a relatively large quantity of binder in order to improve fluidity in the injection molding. For removing the binder, long periods of heat application is required, thereby causing issues such as decrease of production efficiency, and deformation of the compact during the heat treatment.

Further, when the binder in the compact is not sufficiently removed by the heat treatment and then the binder remaining is evaporated during sintering, an issue such as an occurrence of cracks in the sintered body may occur.

In order to solve such issue, JP-A-3-170624, for example, discloses a method for producing a sintered body. The method to obtain the sintered body is as follows: a compact including a raw powder that is an admixture of an inorganic material powder and a binder containing polyacetal is treated with heat in an atmosphere containing acid in the form of a gas or boron trifluoride so as to obtain a degreased body, and the degreased body is sintered.

In general, acid that is a deleterious substance and boron trifluoride that is a poisonous substance are harmful to humans, thereby taking a lot of troubles such as fully protective equipment for handling them.

Further, since acid and boron trifluoride have high metal solubility, materials having high corrosion resistivity need to be used for facilities, thereby causing a high cost.

Furthermore, since an atmosphere containing acid causes air pollution if it is released in the air after heat treatment, cost to prevent it is required.

In addition to the above, polyacetal reacts with an atmosphere containing acid, generating formaldehyde. Since formaldehyde is combustible and flammable, and further, carcinogenic and toxicant, it may cause danger of fire and explosion, and health damage to workers.

Alternatively, such method for producing a sintered body has been known that a compact formed from a raw powder that is an admixture of an inorganic material powder and a binder containing an aliphatic carbonic acid ester based resin is exposed to an atmosphere containing ozone so as to degrease the compact, and then sintering the obtained degreased body.

However, it has been found that even if degreasing is performed in the atmosphere containing ozone, the compact cannot be sufficiently degreased.

Further, since ozone is extremely oxidative, in a case where a metal powder is used as an inorganic material powder, the metal powder is disadvantageously oxidized.

Further, a high cost of a degreasing step is also regarded as an issue because ozone that is consumed in large amounts during degreasing is a very expensive gas.

SUMMARY

An advantage of the present invention is to provide a method by which a sintered body having excellent properties of dimensional precision, mechanical characteristics, and appearance is produced securely and easily at low cost, and to provide a sintered body that is produced by the method and have excellent properties.

The above advantage is attained by the following aspects of the invention.

A method for producing a sintered body according to a first aspect of the invention includes: a) molding a composition containing a powder primarily made of an inorganic material and a binder including an aliphatic carbonic acid ester based resin in a predetermined shape so as to obtain a compact; b) exposing the compact to a first atmosphere containing an alkaline gas and thus decomposing and removing the aliphatic carbonic acid ester based resin from the compact so as to obtain a degreased body; and c) sintering the degreased body so as to obtain a sintered body.

By the method, the sintered body having excellent properties (dimensional accuracy, mechanical characteristics, appearance, and the like) is securely and easily produced at a low cost.

In the method of the aspect, it is preferable that the alkaline gas be primarily made of an ammonia gas.

An ammonia gas is favorable to be used as the alkaline gas because of its especially strong action to decompose the aliphatic carbonic acid ester based resin.

In the method of the aspect, it is preferable that a concentration of the alkaline gas in the first atmosphere be from 20 vol % to 100 vol %.

Under the concentration, the aliphatic carbonic acid ester based resin can be efficiently and securely decomposed and removed.

In the method of the aspect, it is preferable that a temperature of the first atmosphere be from 50 degrees Celsius to 190 degrees Celsius.

Under the temperature, the aliphatic carbonic acid ester based resin can be further efficiently and securely decomposed and removed. In addition, the shape retention of the degreased body can be prevented from degrading. As a result, a dimensional precision of a sintered body to be finally obtained is more securely prevented from degrading.

In the method of the aspect, it is preferable that a number of carbons existing between carbonate ester groups of the aliphatic carbonic acid ester based resin be from 2 to 11.

Accordingly, the aliphatic carbonic acid ester based resin can be more easily and rapidly decomposed.

In the method of the aspect, it is preferable that the aliphatic carbonic acid ester based resin have no unsaturated bonds in a part except the carbonate ester groups.

This improves efficiency of decomposition of the aliphatic carbonic acid ester based resin when the resin contacts an alkaline gas. Therefore, the binder is more efficiently decomposed and removed.

In the method of the aspect, it is preferable that the aliphatic carbonic acid ester based resin have a weight average molecular weight of 10,000 to 300,000.

This makes a melting point and a viscosity of the aliphatic carbonic acid ester based resin optimum, improving the stability of the shape (shape retention) of the compact.

In the method of the aspect, it is preferable that a content rate of the aliphatic carbonic acid ester based resin in the binder be 20 wt % or more.

Under the content rate, the efficiency of decomposing and removing the aliphatic carbonic acid ester based resin can be more securely obtained, accelerating the degreasing of whole of the binder.

The method of the aspect further includes: d) heating the compact so as to decompose and remove a second resin, that is included to the binder and having a heat decomposition temperature which is higher than a melting point of the aliphatic carbonic acid ester based resin, from the compact directly after the step b).

Accordingly, the aliphatic carbonic acid ester based resin and the second resin in the compact can be selectively degreased in a separate manner in the step b) and in the step d). As a result, the progress of the degreasing of the compact can be controlled, being able to easily and securely obtain the degreased body having excellent shape retention and dimensional precision.

In the method of the aspect, it is preferable that a heating temperature in the step d) be from 190 degrees Celsius to 600 degrees Celsius.

Under the temperature, the second resin can be efficiently and securely decomposed and removed.

In the method of the aspect, it is preferable that an atmosphere in the step d) primarily contain a reducing gas.

Thus the second resin can be decomposed and removed while securely preventing the metal material especially of the degreased body that is exposed to the second atmosphere from oxidizing.

In the method of the aspect, the second resin be primarily made of at least one of polystyrene and polyolefin.

These materials have high bonding strength in the degreased body, thereby securely preventing the degreased body from deforming. Further, these materials have high fluidity and are easily decomposed by heating, being able to be easily degreased. As a result, the degreased body having excellent dimensional precision can be more securely obtained.

The method of the aspect further includes: e) exposing the degreased body to a second atmosphere containing a low concentrated alkaline gas whose concentration is lower than a concentration of the alkaline gas of the first atmosphere at least once between the step b) and the step c).

Accordingly, the atmosphere gas containing an alkaline gas remaining in the degreased body is substituted with the atmosphere gas containing a low concentrated alkaline gas. Then contact frequency of the inorganic material and the alkaline gas in the degreased body is reduced, preventing the inorganic material from being nitrided. Consequently, a sintered body that is particularly superior in various properties is obtained.

In the method of the aspect, it is preferable that the second atmosphere practically include no alkaline gas at least at a final stage of the step e).

Thus an alkaline gas can be mostly removed from the degreased body, more securely preventing the inorganic material in the degreased body from being nitrided.

In the method of the aspect, it is preferable that a temperature of the second atmosphere be lower than a temperature of the first atmosphere.

Under the temperature, a reducing action of the alkaline gas of the second atmosphere in the degreased body is further degraded, and the inorganic material in the degreased body is more securely prevented from being nitrided.

In the method of the aspect, it is preferable that the second atmosphere be primarily made of a non-oxygenated gas other than the alkaline gas.

Accordingly, the inorganic material can be prevented from being nitrided and the inorganic material, in particular, a metal material can be prevented from oxidizing.

In the method of the aspect, it is preferable that the steps from b) to c) be sequentially conducted with a continuous furnace.

Thus a plurality of the degreased bodies can be treated at a time and in continuity so as to produce the sintered bodies, improving production efficiency of the sintered body. Further, the continuous furnace prevents the degreased body from being exposed to the air in the middle of producing the sintered body. Therefore, especially the metal material contained in the degreased body can be securely prevented from oxidizing caused by contacting the degreased body with the air.

In the method of the aspect, it is preferable that the continuous furnace be provided with a space that is set to change a concentration of the alkaline gas in a middle of a traveling direction of the compact therein, and the steps from b) to c) be sequentially conducted by allowing the compact to pass through inside of the space.

Accordingly, these steps are conducted in a shorter time.

In the method of the aspect, it is preferable that the compact be molded by one of an injection molding method and an extrusion molding method.

In the injection molding method, the compact in a complex and fine shape can be easily formed by selecting a molding die. Further, in the extrusion molding method, a compact in a column or plate-like shape having a desired extruded surface can be especially easily formed at a low cost by selecting a molding die.

A sintered body according to a second aspect of the invention is produced by the method for producing a sintered body of the first aspect.

Accordingly, the sintered body having excellent properties (dimensional precision, mechanical characteristics, appearance, and the like) is obtained.

It is preferable that the composition further contain an additive and the additive be decomposed and removed together with the second resin from the compact.

Accordingly, the binder can bring out the function of the additive and the additive can be decomposed and removed without adversely affecting the shape retention and the dimensional precision of the degreased body.

It is preferable that the additive include a dispersant to improve dispersibility of the powder in the composition.

Accordingly, the powder, the aliphatic carbonic acid ester based resin, and the second resin disperse more evenly in the composition, and the degreased body and the sintered body to be obtained have properties including few variations and have uniformity.

It is preferable that the dispersant include a higher fatty acid as a main constituent.

The dispersant can particularly improve the dispersibility of the powder in the composition.

It is preferable that the carbon number of the higher fatty acid be in a range from 16 to 30.

Accordingly, the moldability of the composition can be prevented from deteriorating in the molding and thus the composition has excellent shape retention. Further, the higher fatty acid can easily decompose even at a relatively low temperature.

DESCRIPTION OF EXEMPLARY EMBODIMENTS

A method for producing a sintered body, and a sintered body of the present invention will now be described based on preferred embodiments.

Figure 1:
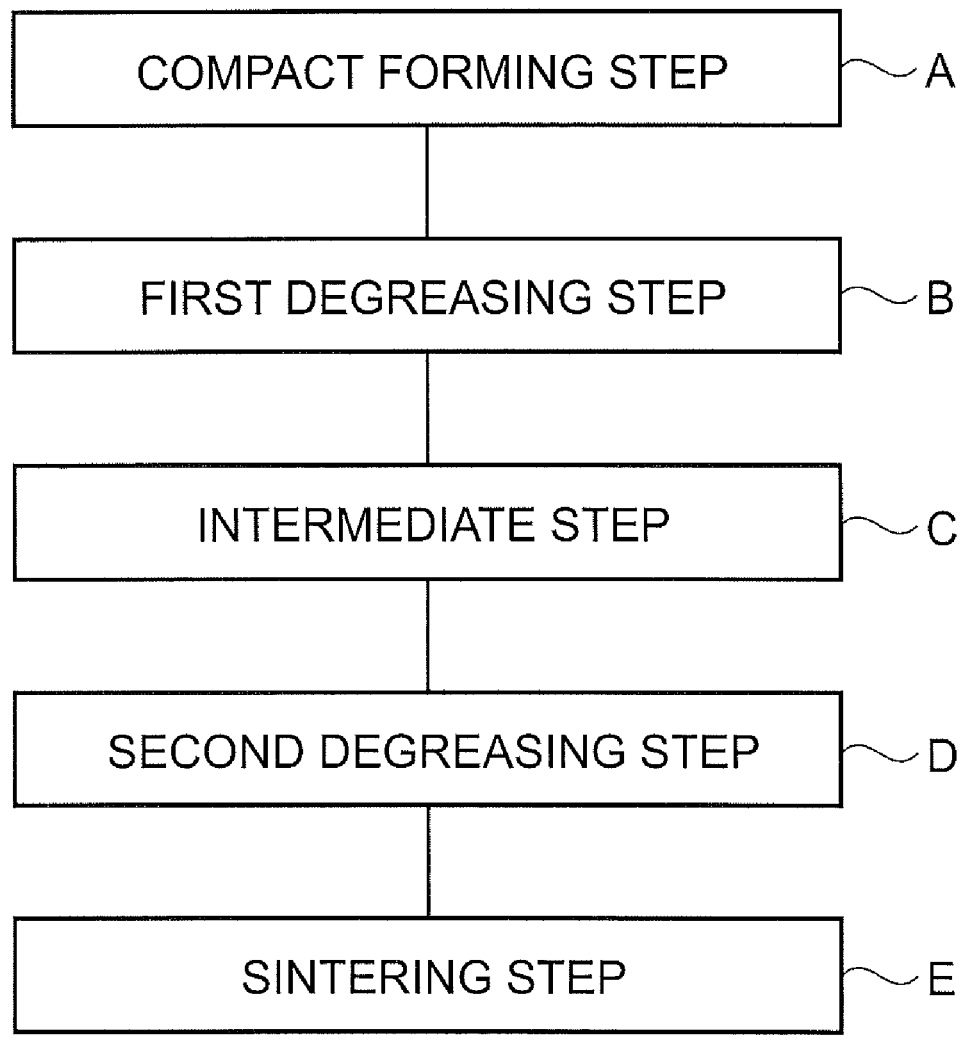
FIG. 1 is a flow chart showing a method for producing a sintered body according to an embodiment of the present invention.
Figure 2:
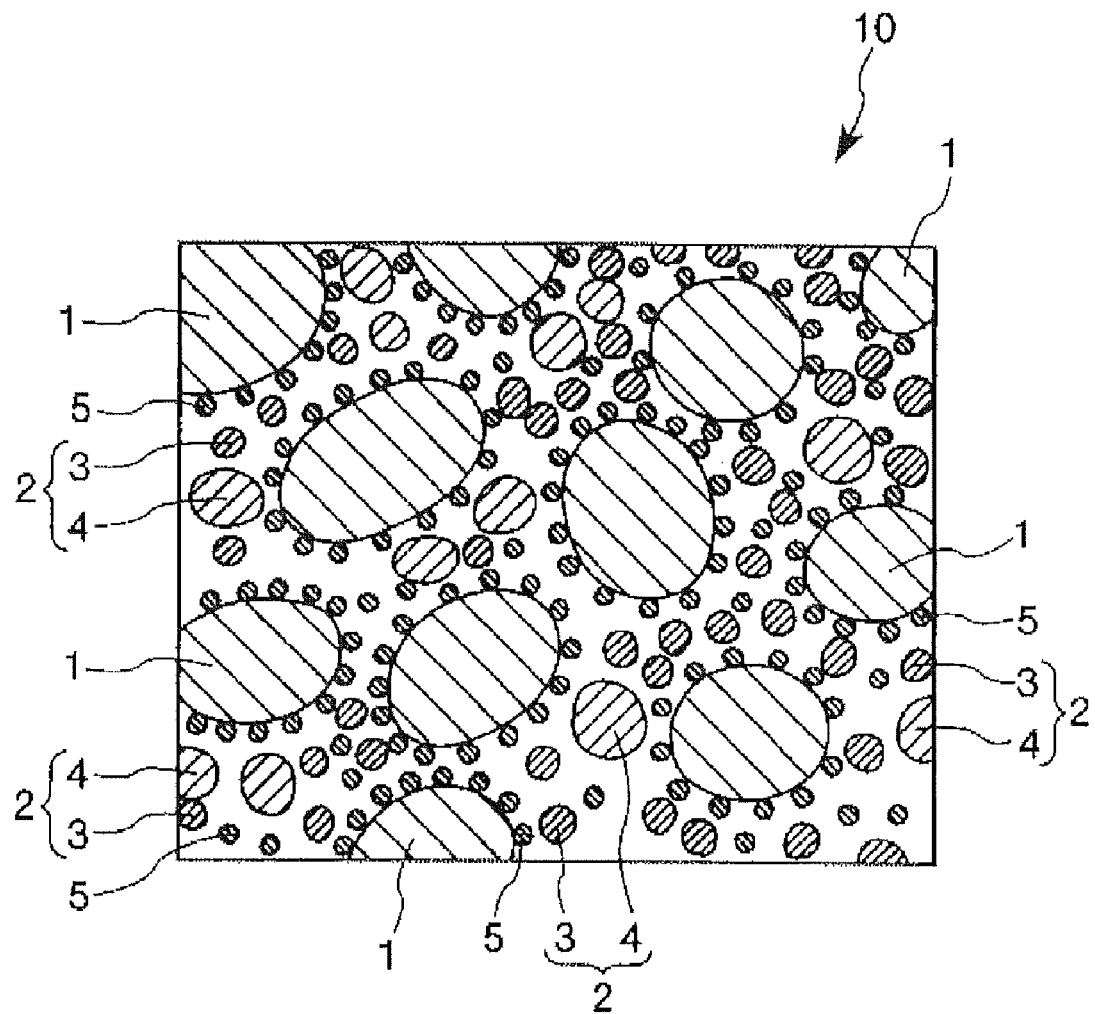
FIG. 2 is a schematic view showing a composition for producing a sintered body used in the method for producing a sintered body according to the embodiment of the invention.

FIG. 1 is a flow chart showing a method for producing a sintered body of an embodiment, and FIG. 2 is a schematic view showing a composition for producing a sintered body.

<Composition for Producing Sintered Body>

A composition 10 that is used for producing a sintered body (composition for producing a sintered body) will be first described.

The composition 10 contains a powder 1 primarily made of an inorganic material and a binder 2 including an aliphatic carbonic acid ester based resin 3.

[1] Powder

The powder 1 is primarily made of an inorganic material.

The inorganic material is not limited, but examples of the inorganic material include: a metal material such as Fe Ni, Co, Cr, Mn, Zn, Pt, Au, Ag, Cu, Pd, Al, W, Ti, V, Mo, Nb, Zr, Pr, Nd, and Sm; an oxide based ceramic material such as alumina, magnesia, beryllia, zirconia, yttria, forsterite, steatite, wollastonite, mullite, cordierite, ferrite, sialon, and cerium oxide; a non-oxide based ceramic material such as silicon nitride, aluminum nitride, boron nitride, titanium nitride, silicon carbide, boron carbide, titanium carbide, and tungsten carbide; and a carbonaceous material such as graphite, nano-carbon (carbon nanotube, and fullerene, for example). These can be used singly or in combination.

Since the composition 10 has excellent moldability as described later, the present invention is suitably applied to a case where a material that has relatively high hardness and is difficult to be processed is used for forming a sintered body.

Specific examples of the metal material include: Fe alloy typified by stainless steel such as SUS304, SUS316, SUS316L, SUS317, SUS329J1, SUS410, SUS430, SUS440, and SUS630, die steel, and high-speed tool steel; Ti or Ti alloy; W or W alloy; Co cemented carbide; and Ni cermet.

Use of two or more kinds of materials that have different compositions from each other can provide a sintered body having a composition that can be produced by casting though the producing has been impossible by casting in related art. Further, a sintered body having new and multiple functions can be easily formed, achieving an expansion of functions and applications of the sintered body.

The average particle diameter of the powder 1 is not limited, but is preferably in a range from about 0.3 to 100 μm, more preferably in a range from about 0.5 to 50 μm. If the average particle diameter of the powder 1 is in the above range, a compact and a sintered body to be obtained by degreasing and sintering such the compact can be produced with excellent moldability (easiness in molding). In addition, the average particle diameter in the above range can increase a density of the sintered body to be obtained, and further improve properties such as mechanical strength and dimensional precision of the sintered body. On the other hand, if the average particle diameter of the powder 1 is less than the above lower limit, the moldability of the compact deteriorates. If the average particle diameter of the powder 1 exceeds the above higher limit, it becomes difficult to sufficiently increase the density of the sintered body, disadvantageously deteriorating the properties of the sintered body.

In the embodiments, the "average particle diameter" means a particle diameter of powder ranging at a part of 50% of accumulative content in an intended powder particle diameter distribution.

The content rate of the powder 1 in the composition 10 is not particularly limited, but is preferably in a range from about 60 to 98 wt %, and more preferably in a range from about 70 to 95 wt %. If the content rate of the powder 1 is in the above range, a compact and a sintered body to be obtained by degreasing and sintering such the compact can be produced with excellent moldability (easiness in molding) and a density of the sintered body to be obtained can be made high. Thus the properties of the sintered body can be enhanced. On the other hand, if the content rate of the powder 1 is less than the above lower limit, the moldability of the compact deteriorates. If the content rate of the powder 1 exceeds the above higher limit, it becomes difficult to sufficiently increase the density of the sintered body, disadvantageously deteriorating the properties of the sintered body.

The powder 1 can be produced in any method. For example, in a case where the powder 1 is made of a metal material, the powder 1 may be produced by various atomization processes such as a liquid atomization like a water atomization (for example, a high-speed rotating water stream atomization, and a rotating liquid atomization), and a gas atomization; and chemical processes such as pulverization method, carbonyl process, and reduction method.

[2] Binder

The binder 2 is a component largely affecting the moldability (easiness in molding) of the composition 10 and stability of a shape (shape retention) of the compact in a compact forming step described later. If the composition 10 contains such component, a sintered body having excellent dimensional precision can be easily and securely formed.

Such the binder 2 includes the aliphatic carbonic acid ester based resin 3.

The aliphatic carbonic acid ester based resin 3 decomposes if it is exposed to an atmosphere containing alkaline gas, so that the resin 3 can be removed easily and rapidly, that is, can be degreased, in a first degreasing step described later. Consequently, time required for a total degreasing process can be reduced and production efficiency of the degreased body, that is, production efficiency of the sintered body can be improved while maintaining the shape retention.

In terms of the aliphatic carbonic acid ester based resin 3, the number of carbons in a part other than a carbonate ester group in a repeating unit, that is, the number of carbons existing between carbonate ester groups in the resin is preferably in a range from 2 to 11, more preferably in a range from 3 to 9, and furthermore preferably in a range from 4 to 7. The number of carbons means the number of "m"s in a case where the aliphatic carbonic acid ester based resin 3 is expressed by a general formula: $-((CH_2)_m-O-CO-O)_n-$, for example. If the number of carbons is within the above range, the aliphatic carbonic acid ester based resin 3 can be easily and rapidly decomposed.

In particular, examples of the aliphatic carbonic acid ester based resin 3 include: polyalkylene carbonate such as polyethylene carbonate; polypropylene carbonate; polytrimethylene carbonate; poly(1,4-butylene carbonate); poly(1,2-butylene carbonate); poly(1,2-isobutylene carbonate); poly(1,5-heptylene carbonate); 1,2-heptylene carbonate; poly(1,6-hexylene carbonate); poly(1,2-hexylene carbonate); polyphenylethylene carbonate; polycyclohexylene carbonate; polymethoxyethylene carbonate; and polyphenoxyethylene carbonate; or these copolymers, and alkanediol polycarbonate such as ethanediol polycarbonate; propanediol polycarbonate; butanediol polycarbonate; hexanediol polycarbonate; and decanediol polycarbonate; or derivatives of these aliphatic carbonic acid ester based resins. They may be used singly or in combination.

Among these examples of the aliphatic carbonic acid ester based resin 3, polypropylene carbonate is especially preferable.

The aliphatic carbonic acid ester based resin 3 can be synthesized, for example, by a phosgene process in which phosgene or its derivative and aliphatic diol are reacted in the presence of a base; a copolymerization process by a zinc catalyst containing an epoxy compound and carbon dioxide; and a transesterification process between diol and organic carbonate ester.

Here, the aliphatic carbonic acid ester based resin 3 decomposes when contacting an alkaline gas, and the decomposed matter vaporizes to be exhausted as a gas to outside of a compact. Examples of the decomposed matter include: alkylene oxide (for example, ethylene oxide and propylene oxide) and its decomposed matter; alkylene carbonate; water; and carbon dioxide. The aliphatic carbonic acid ester based resin described above has high decomposition property, so that the degreasing can be more securely conducted in the first degreasing step. Accordingly, time required for the total degreasing process can be further reduced.

It is preferable that the aliphatic carbonic acid ester based resin 3 has no unsaturated bonds in a part except a carbonate ester group. If such aliphatic carbonic acid ester based resin 3 contacts an alkaline gas, decomposing efficiency thereof improves. Accordingly, the binder 2 can be efficiently decomposed and removed.

The aliphatic carbonic acid ester based resin 3 preferably has a weight average molecular weight of about 10,000 to 300,000, more preferably about 20,000 to 200,000. Accordingly, a melting point and a viscosity of the aliphatic carbonic acid ester based resin 3 become suitable, improving the stability of the shape (shape retention) of the compact.

The content rate of the aliphatic carbonic acid ester based resin 3 within the binder 2 is preferably 20 wt % or more, more preferably 30 wt % or more, and furthermore preferably 40 wt % or more. If the content rate of the aliphatic carbonic acid ester based resin 3 within the binder 2 is within the above range, the aliphatic carbonic acid ester based resin 3 can be securely decomposed and removed, improving the degreasing of whole of the binder 2.

The binder 2 includes a second resin 4 of which a heat decomposition temperature is higher than the melting point of the aliphatic carbonic acid ester based resin 3, in the embodiments. The second resin 4 is decomposed and removed by heating the compact in a second degreasing step conducted after the first degreasing step. The binder 2 includes such second resin 4, so that the aliphatic carbonic acid ester based resin 3 and the second resin 4 can be selectively degreased in a separate manner in the first degreasing step and in the second degreasing step. As a result, the progress of the degreasing of the compact can be controlled, being able to easily and securely obtain a degreased body having excellent shape retention and dimensional precision.

The second resin 4 is not particularly limited, but it preferably has a weight average molecular weight of about 1,000 to 400,000, more preferably about 4,000 to 300,000. Such second resin 4 has suitable melting point and viscosity, further improving the stability of the shape (shape retention) of the compact.

The second resin 4 is not particularly limited as long as it has a heat decomposition temperature higher than the melting point of the aliphatic carbonic acid ester based resin 3 that is included in the binder 2. Examples of the second resin 4 include: styrene resin such as polystyrene; polyolefin such as polyethylene, polypropylene, and ethylene-vinyl acetate copolymer; acrylic resin such as polymethyl methacrylate and polybutyl methacrylate; polyester such as polyvinyl chloride, polyvinylidene chloride, polyamide, polyethylene terephthalate, and polybutylene terephthalate; polyvinyl alcohol; or these copolymer. These may be used singly or in combination.

Among these, the second resin 4 preferably contains at least one of polystyrene and polyolefin as a major component. These materials have high bonding strength in a degreased body, being able to suecrely prevent the degreased body from deforming. Further, these materials have high fluidity and are easily decomposed by heating, being able to be easily degreased. Accordingly, a degreased body and a sintered body that have excellent dimensional precision can be further securely obtained.

The state of the binder 2 is not particularly limited. The binder 2 may be in a powdery state, a liquid state, or a gelled state, for example.

The content rate of the binder 2 in the composition 10 is not particularly limited, but is preferably in a range from about 2 to 40 wt %, more preferably in a range from about 5 to 30 wt %. If the content rate of the binder 2 is in the above range, a compact can be formed with preferable moldability and with high density, being able to make the compact have excellent shape stability.

Further, the composition 10 may content an additive.

The additive is preferably decomposed and removed together with the second resin 4 in the second degreasing step described above. Accordingly, the binder 2 can bring out the function of the additive and the additive can be decomposed and removed without adversely affecting the shape retention and the dimensional precision of the degreased body.

Examples of the additive may include a dispersant (a lubricant), a plasticizer, and an antioxidant. They may be used singly or in combination.

Among these, dispersants 5 adhere to the periphery of the powder 1 as shown in FIG. 2 so as to improve the dispersibility of the powder 1 within the composition 10. Namely, the composition 10 contains the dispersants 5, so that the powder 1, the aliphatic carbonic acid ester based resin 3, and the second resin 4 disperse evenly. Therefore, a degreased body and a sintered body to be obtained have few variations in their properties so as to have uniformity.

The dispersant 5 may have a function as a lubricant, that is, a function enhancing the liquidity of the composition 10 in the compact forming step described later. Thus the filling property of the composition 10 to the molding die can be improved, being able to obtain a sintered body having an even density.

Examples of the dispersant 5 include: higher fatty acid such as stearic acid, distearate, tristearate, linolenic acid, octane acid, oleic acid, palmitic acid, and naphthenic acid; an anionic organic dispersant such as polyacrylic acid, polymethacrylate, polymaleic acid, acrylic acid-maleic acid copolymer, and polystyrene sulfonate; a cationic organic dispersant such as quaternary ammonium salt; a nonionic organic dispersant such as polyvinyl alcohol, carboxymethylcellulose, and polyethyleneglycol; and an inorganic dispersant such as calcium phosphate tribasic.

Among these, one primarily containing the higher fatty acid is preferable as the dispersant 5. The higher fatty acid especially improves the dispersibility and lubricating property of the powder 1.

The number of carbons of the higher fatty acid is preferably in a range from 16 to 30, more preferably 16 to 24. If the number of carbons of the higher fatty acid is in the above range, the moldability of the composition 10 is prevented from deteriorating and thus the composition 10 has excellent shape retention. Further, if the number of carbons is in the above range, the higher fatty acid can easily decompose even in a relatively low temperature.

The plasticizer gives flexibility to the composition 10 so as to facilitate molding in a compact forming step described later.

Examples of the plasticizer include: phthalic acid ester (for example, DOP, DEP, and DBP); adipic acid ester; trimellitic acid ester; and sebacic acid ester.

The antioxidant prevents a resin included in the binder from oxidizing.

Examples of the antioxidant include: a hindered phenol antioxidant; and a hydrazine antioxidant.

The composition 10 containing above components can be prepared by mixing powders corresponding to the respective components. The components may be mixed in any atmosphere, but preferably mixed under a vacuumed or decompressed state (3 kPa or less, for example), or in a non-oxidizing atmosphere of an inert gas such as nitrogen gas, argon gas, and helium gas. Thus, especially the metal material contained in the composition 10 can be prevented from oxidizing.

After being mixed, the mixture may be kneaded as necessary. Accordingly, the bulk density of the composition 10 increases and the compositional uniformity thereof improves, so that a compact having high density and high uniformity can be obtained, improving the dimensional precision of a degreased body and a sintered body.

The composition 10 can be kneaded by various kneaders such as a pressure or double arm kneader, a roll kneader, a Banbury kneader, and a single or double screw extruder, but preferably kneaded by the pressure kneader in particular. Since the pressure kneader can apply high pressure on the composition 10, it can securely knead the composition 10 containing the powder 1 having high hardness or the composition 10 having high viscosity.

Kneading conditions vary depending on a composition or a particle diameter of the powder 1 to be used, a composition of the binder 2, a blending quantity of these, and the like. Examples of the conditions are the following: a kneading temperature of about 50 to 200 degrees Celsius, and a kneading time of about 15 to 210 minutes. The kneading may be conducted in any atmosphere in the same manner as the mixing described above, but preferably conducted under a vacuumed or decompressed state (3 kPa or less, for example), or in a non-oxidizing atmosphere of an inert gas such as nitrogen gas, argon gas, and helium gas. Thus, especially the metal material contained in the composition 10 can be prevented from oxidizing in the same manner as above.

Further, the kneaded product (compound) that is obtained is crushed to be pelletized (become small mass) as necessary. The particle diameter of the pellet is, for example, about 1 to 10 mm.

The kneaded product can be palletized with a crusher such as a pelletizer.

<Producing of Sintered Body>

A method for producing a sintered body (a producing method of a sintered body according to embodiments of the invention) by using the composition 10 will be next described.

First Embodiment

The method for producing a sintered body according to a first embodiment of the invention will be first described.

Figure 3:
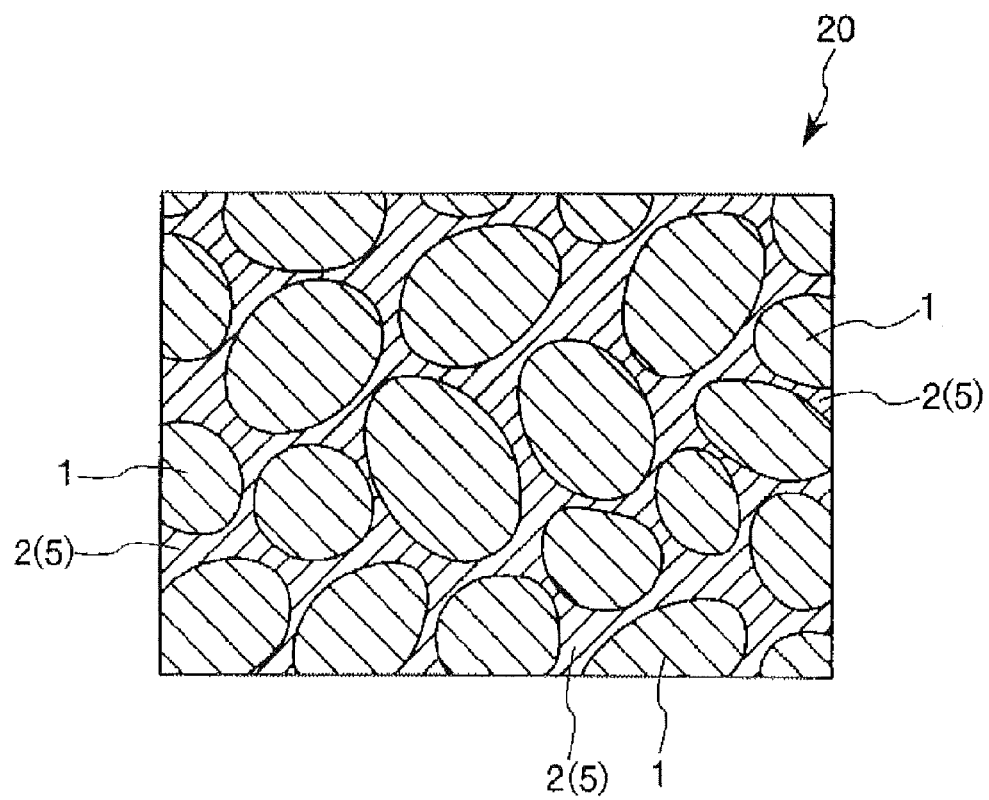
FIG. 3 is longitudinal sectional view schematically showing a compact obtained in the method for producing a sintered body according to the first embodiment of the invention.
Figure 4:
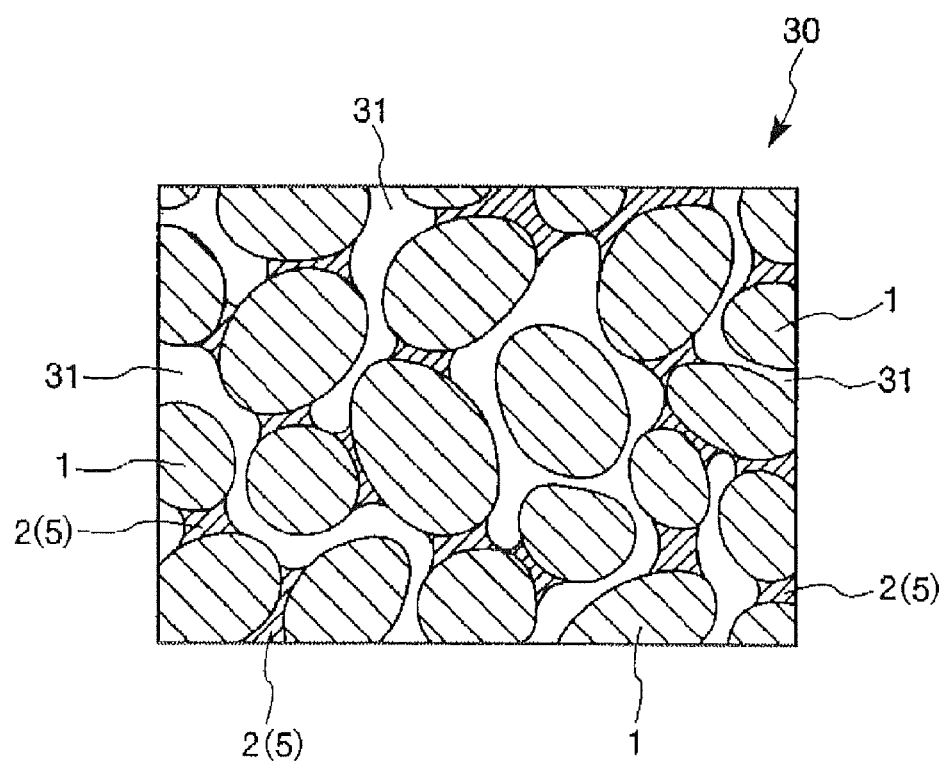
FIG. 4 is longitudinal sectional view schematically showing a first degreased body obtained in the method for producing a sintered body according to the first embodiment of the invention.
Figure 5:
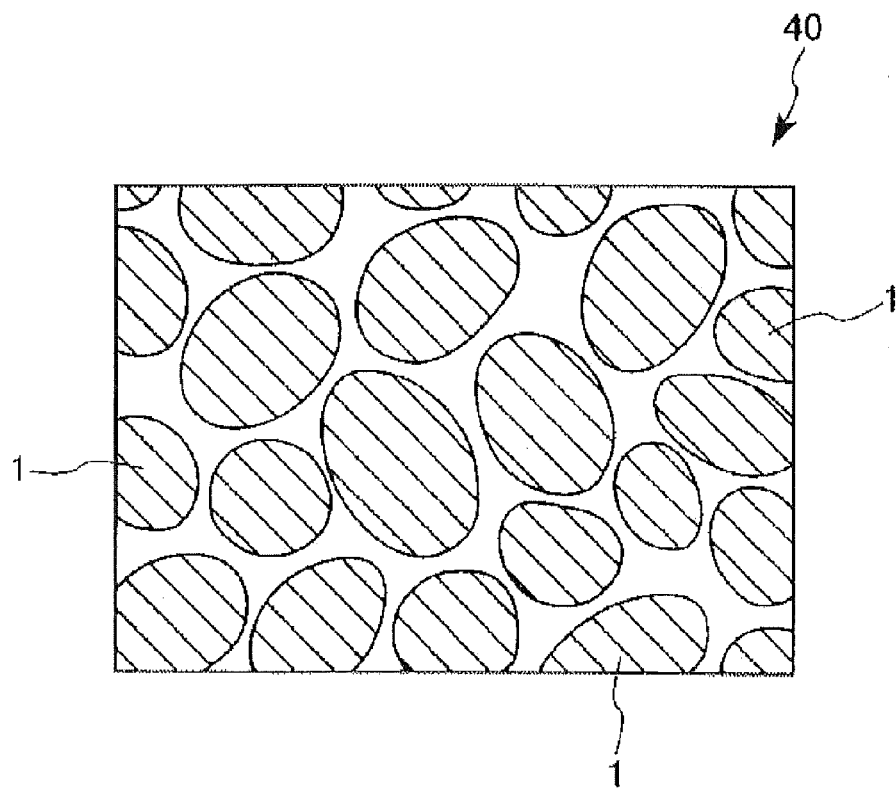
FIG. 5 is longitudinal sectional view schematically showing a second degreased body obtained in the method for producing a sintered body according to the first embodiment of the invention.
Figure 6:
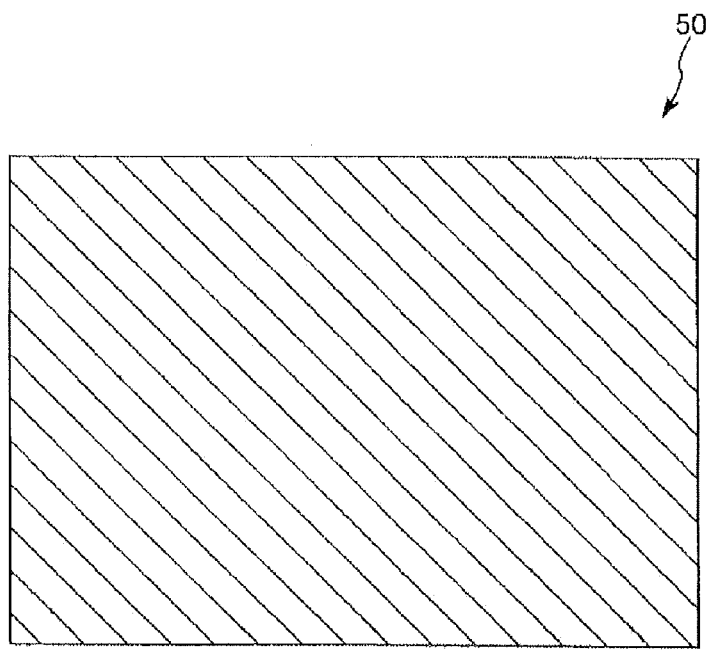
FIG. 6 is a longitudinal sectional view schematically showing a sintered body according to the invention.
Figure 7:
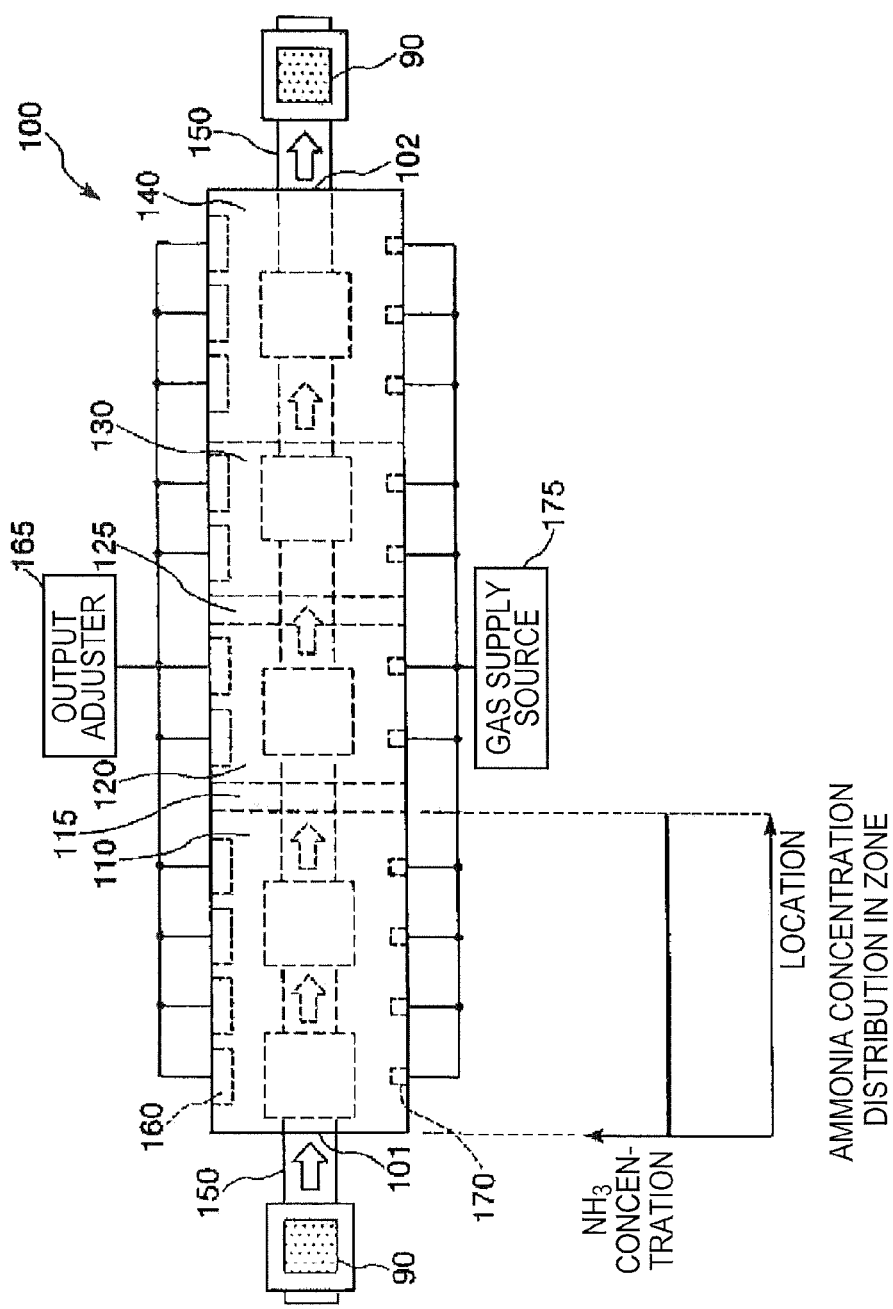
FIG. 7 is a plan view schematically showing a continuous furnace used in the method for producing a sintered body according to the embodiment of the invention.

FIG. 3 is a longitudinal sectional view schematically showing a compact obtained in the present embodiment, and FIG. 4 is a longitudinal sectional view schematically showing a first degreased body obtained in the present embodiment. FIG. 5 is a longitudinal sectional view schematically showing a second degreased body obtained in the present embodiment. Further, FIG. 6 is a longitudinal sectional view schematically showing a sintered body according to the present embodiment, while FIG. 7 is a plan view schematically showing a continuous furnace used in the present embodiment.

A method for producing a sintered body shown in FIG. 1 includes: [A] a compact forming step, [B] a first degreasing step, [C] an intermediate step, [D] a second degreasing step, and [E] a sintering step. In the step [A], the composition 10 is formed in a predetermined shape to obtain a compact. In the step [B], the compact obtained is exposed to an atmosphere containing a highly concentrated alkaline gas whose concentration is relatively higher than that in an intermediate step described later so as to decompose and remove an aliphatic carbonic acid ester based resin 3 from the compact, obtaining a first degreased body. In the step [C], the first degreased body obtained is exposed to an atmosphere containing a low concentrated alkaline gas whose concentration is relatively lower than that in the first degreasing so as to obtain an intermediate degreased body. In the step [D], the intermediate degreased body obtained is heated to decompose and remove a second resin 4 from the intermediate degreased body, obtaining a second degreased body. In the step [E], the second degreased body obtained is sintered to obtain a sintered body.

Here, prior to description of the method for producing a sintered body, a furnace shown in FIG. 7 to be used for degreasing and sintering a compact will be described.

In the method for producing a sintered body according to the embodiment of the invention, any furnaces can be used. For example, a continuous degreasing and sintering furnace, a batch type degreasing furnace and a batch type degreasing and sintering furnace can be used. In the first embodiment, a case of using a continuous degreasing and sintering furnace (hereinafter, abbreviated as "continuous furnace") 100 is described as an example.

The continuous furnace 100 shown in FIG. 7 is provided with four zones (spaces) 110, 120, 130, and 140 that are communicated with each other therein.

Each of the zones 110, 120, 130, and 140 includes a conveyer 150 continuously arranged therein to convey a workpiece 90 such as a compact, a first degreased body, an intermediate degreased body, a second degreased body, and a sintered body. That is, the continuous furnace 100 enables continuous performance of the first degreasing step [B], the intermediate step [C], the second degreasing step [D], and the sintering step [E] by allowing the workpiece 90 to pass through the zones 110, 120, 130, and 140. With the conveyer 150, the workpiece 90 can enter the furnace from a furnace entrance 101, and sequentially pass through the zone 110, the zone 120, the zone 130, and the zone 140, and then exit the furnace from a furnace exit 102 to be out of the furnace. Thus a plurality of the workpieces 90 can be treated at a time so as to produce sintered bodies, improving producing efficiency of a sintered body. Further, by using the continuous furnace 100, the workpiece 90 is prevented from being exposed to air in the middle of producing a sintered body. Therefore, in particular, oxidation of a metal powder caused by contact of the workpiece 90 containing the metal powder with the air is reliably prevented.

In each of the zones 110, 120, 130, and 140, heaters 160 that can individually heat the workpiece 90 in each zone to a predetermined temperature are provided. The heaters 160 are respectively connected to an output adjuster 165 that can adjust an output of the heaters 160. Then, the output adjuster 165 cooperatively controls the output of the heaters 160, enabling each of the zones to have a temperature gradient formed in a predetermined pattern.

Further, each of the zones 110, 120, 130, and 140 is provided with nozzles 170 that can supply a predetermined gas to each of the zones. The nozzles 170 are arranged along a longitudinal direction of the continuous furnace 100 and respectively connected with a gas supply source 175 by pipes. Then, various types of gases generated from the gas supply source 175 are supplied in a predetermined flow amount to each of the zones through the nozzles 170.

Here, in the first embodiment, an alkaline gas concentration in the zone 110 is nearly constant as shown in a graph of FIG. 7.

Further, in a space between the zones 110 and 120, and a space between the zones 120 and 130, exhaust systems 115 and 125 are formed respectively so as to exhaust the gas in each of the spaces to the outside. An operation of the exhaust systems 115 and 125 can prevent the gases from being mixed with each other between the zones 110 and 120, and between the zones 120 and 130. That is, a constitution of each of the gases is prevented from changing undesirably in each of the zones 110, 120, 130, and 140.

The continuous furnace 100 shown in FIG. 7 has a linear shape when it is viewed from above, but may be inflected in the middle.

Now, each step shown in FIG. 1 will be described below sequentially.

[A] Compact Forming Step

First, a kneaded product made by kneading the composition 10 or a pellet made by granulating the kneaded product is formed in a predetermined shape so as to obtain a compact 20 shown in FIG. 3.

The compact 20 may be formed by various molding methods such as injection molding, extrusion molding, compression molding (press molding), and calendering molding, for example. A molding pressure in a case of the compression molding is preferably about 5 to 100 MPa.

Among the various molding methods as above, the compact 20 is preferably formed by the injection molding or the extrusion molding.

In the injection molding, a kneaded product or a pellet is molded by injection with an injection molder so as to form the compact 20 having a desired shape and dimension. In this case, by selecting a molding die, the compact 20 can be easily formed to be even in a complex and fine shape.

A molding condition of the injection molding differs depending on a composition or a particle diameter of the powder 1 to be used, a composition of the binder 2, a blending quantity thereof, and the like. An example of the condition is the following: a material temperature is preferably about 80 to 210 degrees Celsius, and the injection pressure is preferably about 2 to 15 MPa (20 to 150 kgf/cm$^2$).

In the extrusion molding, a kneaded product or a pellet is molded by extruding with an extruder, and then cut into a desired length so as to form the compact 20. In this case, by selecting a molding die, the compact 20 can be especially easily and inexpensively formed to be in a column or plate-like shape having a desired extruded surface.

A molding condition of the extrusion molding differs depending on a composition and a particle diameter of the powder 1 to be used, a composition of the binder 2, blending quantity thereof, and the like. An example of the condition is the following: a material temperature is preferably from about 80 to about 210 degrees Celsius, and an extrusion pressure is preferably from about 1 to about 10 Mpa (from 10 to 100 kgf/cm$^2$).

A dimension of the compact 20 to be formed is determined with the assumption of shrinkage or the like of the compact 20 in each of the degreasing steps, the intermediate step, and the sintering step to be conducted later.

[B] First Degreasing Step

Next, the compact 20 obtained in the compact forming step is loaded on the conveyer 150 of the continuous furnace 100 and carried to the zone 110. Then the compact 20 is exposed to the atmosphere containing a highly concentrated alkaline gas whose concentration is relatively higher than that in the intermediate step described later while the compact 20 passes through the zone 110. Thus the aliphatic carbonic acid ester based resin 3 is decomposed and removed from the compact 20, obtaining a first degreased body 30 shown in FIG. 4.

As described above, the aliphatic carbonic acid ester based resin 3 is decomposed at a relatively low temperature by contacting an alkaline gas. Then, the decomposed matter is converted into a gas and easily and rapidly removed (degreased) from the compact 20. On the other hand, most of the second resin 4 and an additive remain in the compact 20 without being decomposed although a part of them is decomposed in this step. According to the above, the total time required for degreasing can be shortened while maintaining shape retention of the first degreased body 30 obtained.

Further, at this time, the decomposed matter of the aliphatic carbonic acid ester based resin 3 is exhausted from inside of the compact 20 to outside. Accompanied by this, an extremely small flow path 31 is formed along a trail of the decomposed matter passing through in the first degreased body 30. The flow path 31 will be a flow path for decomposed matters of the second resin 4 and the additive to be exhausted to outside of the compact 20 in the second degreasing step described later. Therefore, this flow path 31 can accelerate degreasing in the second degreasing described later.

Further, the flow path 31 is formed by that the aliphatic carbonic acid ester based resin 3 contacts an alkaline gas to be decomposed. Namely, the path 31 is sequentially formed from an outer surface toward the inside of the compact 20. Therefore, the flow path 31 is inevitably communicated with an outer space, ensuring exhaust of the decomposed matters of the second resin 4 and the additive to outside in the second degreasing step described later.

In addition to the advantageous effects above, especially in a case where the compact 20 includes a metal powder, a content rate of oxygen of the first degreased body 30 can be prevented from increasing because the alkaline gas does not oxidize the metal powder.

The atmosphere containing a highly concentrated alkaline gas used in the present step, as described above, has an alkaline gas concentration that is relatively higher than that of the atmosphere containing a low concentrated alkaline gas used in the intermediate step described later.

Examples of the alkaline gas include an ammonia ($NH_3$) gas, and an amine gas such as trimethylamine (($CH_3$)$_3$N).

Further, in particular, among such alkaline gases, one containing an ammonia gas as a main constituent is preferable. An ammonia gas is favorable to be used as an alkaline gas for the embodiment because of its strong action to decompose the aliphatic carbonic acid ester based resin 3.

Further, other than the alkaline gas, the atmosphere containing a highly concentrated alkaline gas may contain an inert gas such as nitrogen, helium, and argon; a reducing gas such as hydrogen; and a non-oxygenated gas such as a mixed gas containing two or more of these. Among them, the atmosphere containing a highly concentrated alkaline gas preferably includes an inert gas other than the alkaline gas, more preferably includes an inert gas containing nitrogen as its main constituent. An inert gas has poor reactivity with constituent materials of the powder 1, preventing the powder 1 from altering and deteriorating due to an unwanted chemical reaction or the like. In addition, since nitrogen is relatively inexpensive, cost reduction of the first degreasing step can be achieved.

Further, a concentration of the alkaline gas in the atmosphere containing a highly concentrated alkaline gas is preferably in a range from about 20 to about 100 vol %, more preferably in a range from about 30 to about 100 vol %, and furthermore preferably in a range from about 50 to about 100 vol %. The alkaline gas having a concentration within the above range can efficiently and securely decompose and remove the aliphatic carbonic acid ester based resin 3. However, even if the concentration of the alkaline gas exceeds the upper limit described above, further increase of the efficiency with decomposing of the aliphatic carbonic acid ester based resin 3 by the alkaline gas cannot be expected.

Further, in the first degreasing step as the above, it is preferable that a new atmosphere containing a highly concentrated alkaline gas be supplied around the compact 20 so as to perform degreasing while the decomposed matter of the aliphatic carbonic acid ester based resin 3 is exhausted. This can prevent the deterioration of the efficiency decomposing the aliphatic carbonic acid ester based resin 3 by alkaline gas. The deterioration is caused by that the concentration of the decomposed gas exhausted from the compact 20 increases around the compact 20 as the degreasing proceeds.

At this time, a flow amount of the gas to be supplied to the atmosphere containing a highly concentrated alkaline gas is appropriately arranged with respect to a volume of the zone 110. The flow amount is not particularly limited, but it is preferably from about 1 to about 30 $m^3/h$, more preferably from 3 to about 20 $m^3/h$.

Further, a temperature of the atmosphere containing a highly concentrated alkaline gas is preferably in a range from about 50 to about 190 degrees Celsius, and more preferably in a range from 70 to about 170 degrees Celsius although it may differ depending on a composition of the aliphatic carbonic acid ester based resin 3 and the like. The alkaline gas having a temperature within the above range can efficiently and securely decompose and remove the aliphatic carbonic acid ester based resin 3. In addition, significant softening of the second resin 4 can be avoided, preventing the shape retention of the first degreased body 30 from decreasing. As a result, a dimensional precision of a sintered body to be finally obtained is more securely prevented from decreasing.

Further, time for the first degreasing is appropriately arranged with respect to a content rate of the aliphatic carbonic acid ester based resin 3, the temperature of the atmosphere containing a highly concentrated alkaline gas and the like. The time is not particularly limited, but it is preferably from about 1 to about 30 hours, and more preferably from 3 to about 20 hours. According to the above, the aliphatic carbonic acid ester based resin 3 can be efficiently and securely decomposed and removed.

[C] Intermediate Step

Next, the first degreased body 30 obtained in the first degreasing step is carried to the zone 120 by the conveyer 150. Then, while the first degreased body 30 passes through the zone 120, it is exposed to the atmosphere containing a low concentrated alkaline gas whose concentration is lower than that of the atmosphere containing a highly concentrated alkaline gas.

Here, the first degreased body 30 after undergoing the first degreasing step has an atmosphere gas in its flow path 31 having been formed. The atmosphere gas remaining in the flow path 31 contains a highly concentrated alkaline gas whose concentration of an alkaline gas is high. An alkaline gas decomposes the aliphatic carbonic acid ester based resin 3 by breaking a bond of the resin 3 because of its reducing action. However, in a case where a gas (e.g. ammonia) containing nitrogen atom is used as an alkaline gas, nitriding of an inorganic material may be caused depending on a composition of an inorganic material powder contained in the first degreased body 30. In particular, in a case where the first degreased body 30 proceeds to a second degreasing or sintering in a manner that the highly concentrated alkaline gas remains in the flow path 31, progression of nitriding of an inorganic material becomes more remarkable due to heat application.

If the inorganic material is nitrided, characteristics (e.g. mechanical characteristics, electrical characteristics, and chemical characteristics) of a sintered body to be finally obtained may disadvantageously degraded. In particular, there is a possibility that mechanical characteristics deteriorate due to the effect of nitride.

Therefore, in the first embodiment, the intermediate step for exposing the first degreased body 30 to the atmosphere containing a low concentrated alkaline gas is performed.

In the intermediate step, the atmosphere gas containing a highly concentrated alkaline gas remaining in the flow path 31 is substituted to an atmosphere gas containing a low concentrated alkaline gas (or a gas containing no alkaline gas). Thus, contact frequency of the inorganic material and the alkaline gas in the first degreased body 30 is reduced, preventing the inorganic material from being nitrided. Consequently, a sintered body that is particularly superior in various characteristics is obtained.

Here, concentration of an alkaline gas in the atmosphere containing a low concentrated alkaline gas is not limited as long as it is lower than that in the atmosphere containing a highly concentrated alkaline gas. However, it is preferable to be as low as possible.

Specifically, although the alkaline gas concentration of the atmosphere containing a low concentrated alkaline gas differs depending on the alkaline gas concentration of the atmosphere containing a highly concentrated alkaline gas, it is preferably less than 20 vol %, and more preferably less than 10 vol %.

Further, it is more preferable that the atmosphere containing a low concentrated alkaline gas contain no alkaline gas substantially. Thus an alkaline gas can be mostly removed from the flow path 31, more securely preventing the inorganic material from being nitrided.

Further, other than the alkaline gas, the atmosphere containing a low concentrated alkaline gas may contain an inert gas such as nitrogen, helium, and argon; a reducing gas such as hydrogen; and a non-oxygenated gas such as a mixed gas containing two or more of these. In particular, it is preferable to contain the non-oxygenated gas as a main constituent. According to the above, the inorganic material, in particular, a metal material can be prevented from oxidizing, while preventing the inorganic material from being nitrided.

At this time, a flow amount of the atmosphere gas containing a low concentrated alkaline gas to be supplied is appropriately arranged with respect to the volume of the zone 120. The flow amount is not particularly limited, but it is preferably from about 0.5 to about 30 m$^3$/h, more preferably from 1 to about 20 m$^3$/h.

Further, it is preferable that a temperature of the atmosphere containing a low concentrated alkaline gas be lower than that of the atmosphere containing a highly concentrated alkaline gas in the first degreasing step. Accordingly, a reducing action of the alkaline gas of the atmosphere containing a low concentrated alkaline gas in the flow path 31 is further reduced, and the inorganic material in the first degreased body 30 is more securely prevented from being nitrided.

More specifically, a temperature of the atmosphere containing a low concentrated alkaline gas is preferably from about 10 to about 180 degrees Celsius, and more preferably from 30 to about 120 degrees Celsius although it may differ depending on the temperature of the atmosphere containing a highly concentrated alkaline gas. Under the temperature, a reducing action of the alkaline gas of the atmosphere containing a low concentrated alkaline gas is more securely suppressed, while the first degreased body 30 is prevented from receiving a rapid temperature change.

Further, it is desirable that the time for the first degreasing step be as long as possible, but it is preferably about 0.1 to about 5 hours, more preferably about 0.5 to 3 hours. Thus the highly concentrated alkaline gas remaining in the flow path 31 is sufficiently substituted with the atmosphere gas containing a low concentrated alkaline gas.

As the above, an intermediate degreased body formed by substituting the highly concentrated alkaline gas remaining in the flow path 31 of the first degreased body 30 with the atmosphere gas containing a low concentrated alkaline gas is obtained.

However, this step is conducted according to need, so that it may be omitted. In this case, the degreased body will be obtained through the first degreasing step and a second degreasing step to be described later.

[D] Second Degreasing Step

Next, the intermediate degreased body obtained in the intermediate step is carried to the zone 130 by the conveyer 150. The intermediate degreased body is heated while it passes through the zone 130. Thus the second resin 4 and the additive (e.g. a dispersing agent 5) are decomposed and removed from the intermediate degreased body, providing a second degreased body 40 as shown in FIG. 5.

The second resin 4 (and the additive) decomposed by heat application is exhausted to outside of the intermediate degreased body through the flow path 31 formed in the first degreasing step, being easily and rapidly degreased. Accordingly, the second resin 4 and the additive are prevented from remaining in large amounts inside the second degreased body 40. That is, the degreasing is performed through the flow path 31, preventing the decomposed matters of the second resin 4 and the additive from being enclosed inside the intermediate body. Therefore, deformation and cracks occurring to the second degreased body 40 are securely prevented and degreasing efficiency becomes high, thereby shortening the total time required for degreasing. As a result, the second degreased body 40 and the sintered body having superior characteristics such as dimensional precision and mechanical strength are efficiently obtained.

The flow path 31 in the intermediate degreased body disappears during the sintering step described later, or even if it remains, it is an extremely minute pore. Therefore, the sintered body to be obtained has particularly high density. Further, the sintered body to be obtained will hardly have problems such as poor aesthetic appearance, low mechanical strength, or the like.

The atmosphere in which this step (the second degreasing step) is conducted is not particularly limited, but may be a reducing atmosphere such as hydrogen; an inert atmosphere such as nitrogen, helium, and argon; a reduced-pressure atmosphere (vacuum); and the like.

In particular, the atmosphere in which this step is conducted preferably contains a reducing gas as a main constituent. Although this step is conducted under an atmosphere at a relatively high temperature, if the atmosphere includes a reducing gas as a main constituent, especially the metal material in the intermediate degreased body is securely prevented from oxidizing.

Further, the temperature of the atmosphere is not limited as long as it is higher than the temperature of the atmosphere in the first degreasing step, and it slightly differs depending on a composition of the second resin 4 and the additive. However, it is preferably in a range from about 190 to about 600 degrees Celsius, and more preferably in a range from 250 to about 550 degrees Celsius. Under the atmosphere at the temperature within the above range, the second resin 4 and the additive are efficiently and securely decomposed and removed. On the contrary, if the temperature of the atmosphere is less than the lower limit of the above, the efficiency of decomposing and removing the second resin 4 and the additive may be degraded. Further, even if the temperature of the atmosphere is more than the upper limit, a speed of decomposing and removing the second resin 4 and the additive is hardly improved, so that it is not efficient.

Further, time for the second degreasing step is appropriately arranged with respect to a composition and a content rate of the second resin 4 and the additive, the temperature of the atmosphere, and the like. The time is not particularly limited, but it is preferably from about 0.5 to about 10 hours, and more preferably from 1 to about 5 hours. Accordingly, the second resin 4 and the additive can be efficiently and securely decomposed and removed (decreased).

However, this step is conducted according to need, so that it may also be omitted if the composition 10 does not contain the second resin 4 and the additive, for example. In this case, the degreased body will be obtained through the first degreasing step and the intermediate step. Further, if the intermediate step is also omitted, the degreased body will be obtained through the first degreasing step.

[E] Sintering Step

Next, the second degreased body 40 obtained in the second degreasing step is carried to the zone 140 by the conveyer 150. Then, the second degreased body 40 is heated while it passes through the zone 140.

If the second degreased body 40 is heated, grain growth of the powder 1 inside thereof occurs by mutual dispersion at an interface of ones contacting each other, forming crystal grain. As a result, a sintered body 50 that is dense as a whole, that is, having high density and low porosity, is obtained as shown in FIG. 6.

The sintering temperature of the sintering step slightly differs depending on a composition of the material composing the powder 1 or the like, but it is preferably in a range from about 900 to about 1800 degrees Celsius, more preferably in a range from about 1000 to about 1700 degrees Celsius. Under the sintering temperature within the above range, dispersion and grain growth of the powder 1 are optimized, providing the sintered body 50 having superior characteristics (mechanical strength, dimensional precision, appearance, and the like).

Further, the sintering temperature of the sintering step can temporally vary (increase or decrease) within or out of the above range.

The sintering time is preferably from about 0.5 to about 7 hours, more preferably from about 1 to about 4 hours.

The atmosphere in which the sintering step is conducted is appropriately selected also in accordance with a composition of the inorganic material composing the powder 1. The atmosphere is not particularly limited, but it may be a reducing atmosphere such as hydrogen; an inert atmosphere such as nitrogen, helium, and argon; a reduced-pressure atmosphere reducing pressure of each of these atmospheres; or a pressurized atmosphere by pressurizing; or the like.

Among them, it is preferable that the atmosphere for the sintering step be the reduced-pressure atmosphere. Under the reduced-pressure atmosphere, especially the metal material in the second degreased body 40 is sintered without being oxidized. In addition, since an evacuation pump to form the reduced-pressure atmosphere is not required, a running cost for the sintering step can be reduced.

In a case of the reduced-pressure atmosphere, the pressure is not particularly limited, but it is preferably 3 kPa (22.5 Torr) or less, more preferably 2 kPa (15 Torr) or less.

Further, in a case of the pressurized atmosphere, the pressure is also not particularly limited, but it is preferably from about 110 to about 1500 kPa, and more preferably from about 200 to about 1000 kPa.

In addition, the atmosphere for the sintering step can be changed during the step. For example, first a reduced-pressure atmosphere of about 3 kPa is employed, and then it can be changed to the inert atmosphere as described above in the middle of the sintering step.

Further, the sintering step can be divided into two or more steps to be conducted. Accordingly, efficiency in sintering the powder 1 is improved, being able to sinter in a shorter period of time.

In addition, it is preferable that the sintering step be sequentially conducted with the second degreasing step. Accordingly, the second degreasing step can double as presintering step and thus the second degreased body 40 is preheated, thereby more securely sintering the powder 1.

As the above, the sintered body having excellent characteristics (dimensional precision, mechanical characteristics, appearance, and the like) is securely and easily produced at a low cost.

Second Embodiment

A method for producing a sintered body according to a second embodiment of the present invention will now be described.

Figure 8:
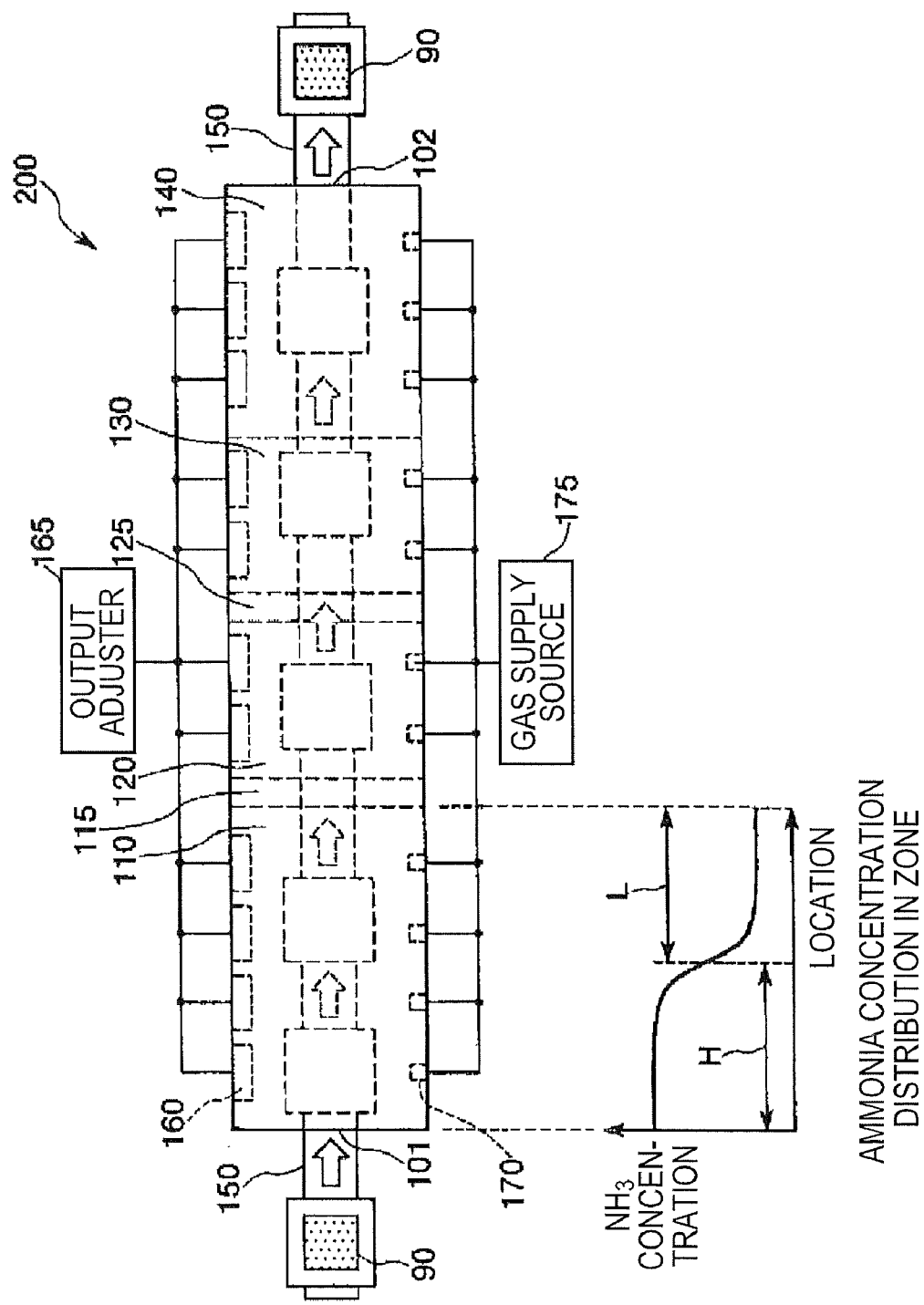
FIG. 8 is a plan view schematically showing a continuous furnace used in the method for producing a sintered body according to a second embodiment of the invention.

FIG. 8 is a plan view schematically showing a continuous furnace used in the second embodiment.

The second embodiment will be described below. In the description, differences from the first embodiment will be mainly explained, and the same contents of them are omitted.

The method for producing a sintered body according to the second embodiment is the same as that in the first embodiment except for setting of an atmosphere of the continuous furnace.

That is, in a continuous furnace 200 shown in FIG. 8, an alkaline gas concentration is continuously changed along a traveling direction of the workpiece 90 in the zone 110.

A graph in FIG. 8 shows a distribution of the alkaline gas concentration in the zone 110. As shown in the graph, the alkaline gas concentration in the zone 110 is reduced toward a front of the traveling direction of the workpiece 90 in the middle. That is, the zone 110 is divided into a region H and a region L. The region H is located in a furnace entrance side and has an atmosphere containing a highly concentrated alkaline gas whose alkaline gas concentration is relatively high, while the region L is located in a zone 120 side and has an atmosphere containing a low concentrated alkaline gas whose concentration is lower than that of the atmosphere containing a highly concentrated alkaline gas.

In order to grade alkaline gas concentration in the zone 110 as the above, among the nozzles 170 formed in the zone 110, nozzles 170 corresponding to the region H and nozzles 170 corresponding to the region L supply different type and flow amount of gas from each other, for example.

Now, each step of the method for producing a sintered body according to the second embodiment employing the continuous furnace 200 as the above will now be sequentially described.

[A] Compact Forming Step

First, similarly to the first embodiment, the compact 20 as shown in FIG. 3 is obtained.

[B] First Degreasing Step

Next, the compact 20 obtained in the compact forming step is loaded on the conveyer 150 of the continuous furnace 200 and carried to the zone 110. Then the compact 20 is exposed to the atmosphere containing a highly concentrated alkaline gas while it passes through the region H in the zone 110. Thus, similarly to the first embodiment, the aliphatic carbonic acid ester based resin 3 is decomposed and removed from the compact 20, providing the first degreased body 30 as shown in FIG. 4.

[C] Intermediate Step (First Time)

Next, the first degreased body 30 obtained in the first degreasing step is carried to the region L in the zone 110 by the conveyer 150. Then the first degreased body 30 is exposed to the atmosphere containing a low concentrated alkaline gas while it passes through the region L. As the above, similarly to the first embodiment, the atmosphere gas containing a highly concentrated alkaline gas remaining in the flow path 31 of the first degreased body 30 is substituted with the atmosphere gas containing a low concentrated alkaline gas.

[C] Intermediate Step (Second Time)

Next, the first degreased body 30 after undergoing the first intermediate step is carried to the zone 120 by the conveyer 150. Then the first degreased body 30 is exposed to the atmosphere substantially containing no alkaline gas while it passes through the zone 120. As the above, an intermediate degreased body formed by removing almost all of the alkaline gas remaining in the flow path 31 of the first degreased body 30 is obtained.

[D] Second Degreasing Step

Next, the intermediate degreased body obtained in the intermediate step is carried to the zone 130 by the conveyer 150. Then, the intermediate degreased body is heated while it passes through the zone 130. According to the above, similarly to the first embodiment, the second resin 4 and the additive (e.g. the dispersing agent 5) are decomposed and removed from the intermediate degreased body, providing the second degreased body 40 as shown in FIG. 5.

[E] Sintering Step

Next, the second degreased body 40 obtained in the second degreasing step is carried to the zone 140 by the conveyer 150. Then, the second degreased body 40 is heated while it passes through the zone 140. According to the above, similarly to the first embodiment, the second degreased body 40 is sintered, providing the sintered body 50 as shown in FIG. 6.

In the second embodiment, the first degreasing step and the intermediate step are sequentially conducted in a single zone that is the zone 110. According to the above, the atmosphere in the zone 110 is continuously changed from the atmosphere containing a highly concentrated alkaline gas to the atmosphere containing a low concentrated alkaline gas. At this time, in the compact 20, the powder 1 made of the inorganic material that has been covered with the aliphatic carbonic acid ester based resin 3 gradually comes out as the aliphatic carbonic acid ester based resin 3 having been exposed to the atmosphere containing a highly concentrated alkaline gas is decomposed and removed. Then, accompanied with this coming out, the powder 1 is gradually exposed to the alkaline gas.

However, in the second embodiment, the atmosphere in the zone 110 is arranged so as to be changed from the atmosphere containing a highly concentrated alkaline gas to the atmosphere containing a low concentrated alkaline gas, so that frequency that the powder 1 coming out is exposed to the alkaline gas is suppressed. Thus the metal material composing the powder 1 can be especially prevented from oxidizing.

Further, the first degreasing step and the intermediate step are sequentially conducted in a single zone that is the zone 110, thereby further shortening the time required for conducting these steps.

In addition, conduction of the two separate intermediate steps can make the alkaline gas remaining in the flow path 31 of the first degreased body 30 securely removed.

In the method for producing a sintered body according to the second embodiment, the same performance and advantages as in the first embodiment can also be obtained.

Third Embodiment

A method for manufacturing a sintered body according to a third embodiment of the present invention will be now described.

Figure 9:
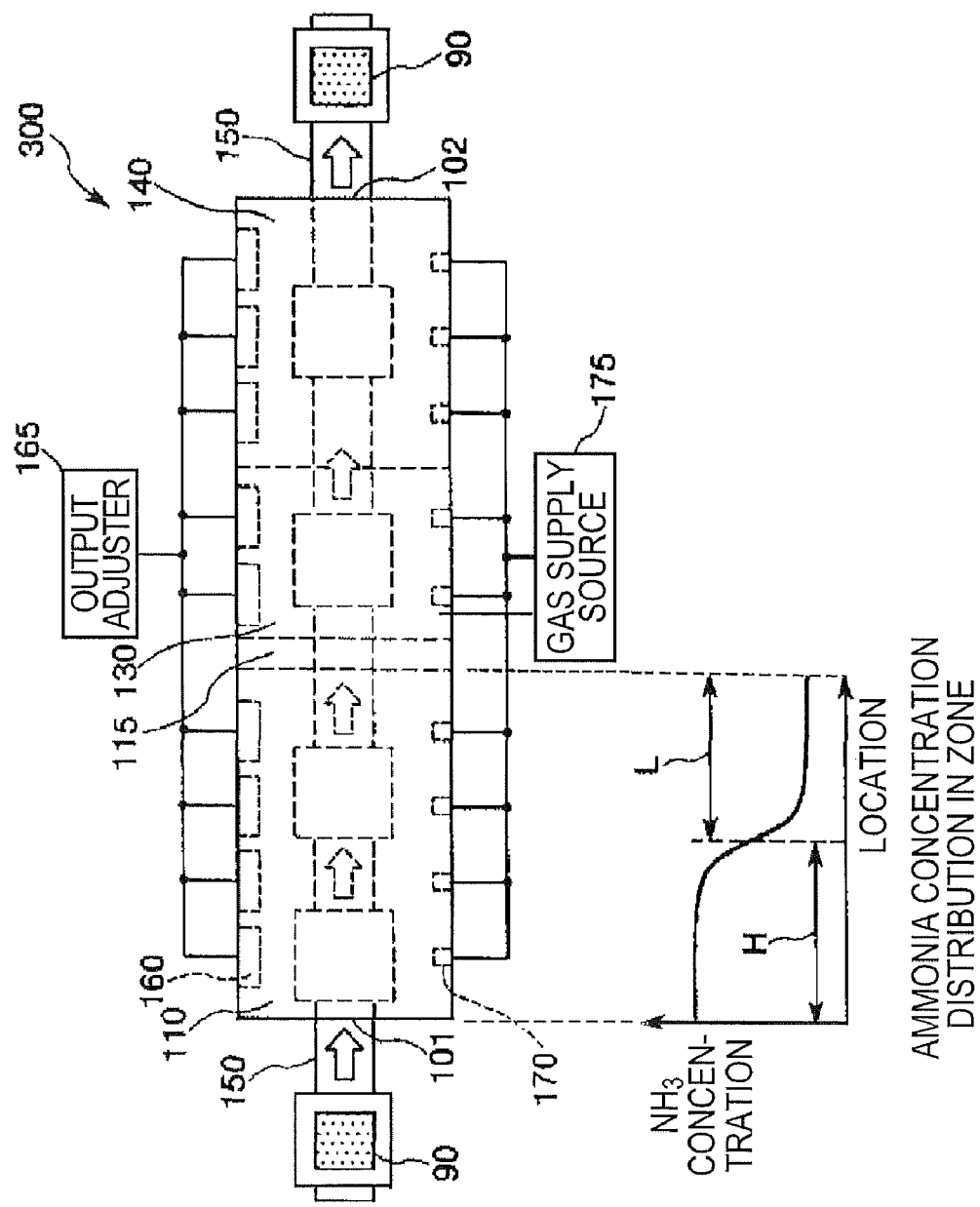
FIG. 9 is a plan view schematically showing a continuous furnace used in the method for producing a sintered body according to a third embodiment of the invention.

FIG. 9 is a plan view schematically showing a continuous furnace used in the third embodiment.

Now, the third embodiment will be described below, however, in the description, differences from the first and second embodiments will be mainly explained, and description of the same contents are omitted.

The method for producing a sintered body according to the third embodiment is the same as that in the second embodiment except for a structure of a continuous furnace to be used.

A continuous furnace 300 shown in FIG. 9 is provided with three zones (spaces) 110, 130, and 140 that are communicated with each other therein. That is, the continuous furnace 300 shown in FIG. 9 is structured by omitting the zone 120 among the zones 110, 120, 130, and 140 of the continuous furnace 200 shown in FIG. 8.

Similarly to the first embodiment, each of the zones 110, 130, and 140 is provided with the conveyer 150.

Further, each of the zones 110, 130, and 140 is individually provided with a plurality of heaters 160 and a plurality of nozzles 170 therein, similarly to the continuous furnaces shown in FIGS. 7 and 8. Further, each of the heaters 160 is connected to the output adjuster 165, while each of the nozzles 170 is connected to the gas supply source 175.

Here, in the third embodiment, an alkaline gas concentration is continuously changed along a traveling direction of the workpiece 90 in the zone 110, similarly to the zone 110 shown in FIG. 8.

A graph in FIG. 9 shows a distribution of the alkaline gas concentration in the zone 110. As shown in the graph, similarly to the zone 110 shown in FIG. 8, the alkaline gas concentration in the zone 110 is reduced toward the front of the traveling direction of the workpiece 90 in the middle. That is, the zone 110 is divided into the region H and the region L. The region H has an atmosphere containing a highly concentrated alkaline gas, while the region L has an atmosphere containing a low concentrated alkaline gas.

Now, each step of the method for producing a sintered body according to the third embodiment employing the continuous furnace 300 as the above will now be sequentially described.

[A] Compact Forming Step

First, similarly to the first and second embodiments, the compact 20 as shown in FIG. 3 is obtained.

[B] First Degreasing Step

Next, the compact 20 obtained in the compact forming step is loaded on the conveyer 150 of the continuous furnace 300 and carried to the zone 110. Then the compact 20 is exposed to the atmosphere containing a highly concentrated alkaline gas while it passes through the region H in the zone 110. According to the above, similarly to the first and second embodiments, the aliphatic carbonic acid ester based resin 3 is decomposed and removed from the compact 20, providing the first degreased body 30 as shown in FIG. 4.

[C] Intermediate Step

Next, the first degreased body 30 obtained in the first degreasing step is carried to the region L in the zone 110 by the conveyer 150. Then the first degreased body 30 is exposed to the atmosphere containing a low concentrated alkaline gas while it passes through the region L. As the above, similarly to the first and second embodiments, the atmosphere gas containing a highly concentrated alkaline gas remaining in the flow path 31 of the first degreased body 30 is substituted with the atmosphere gas containing a low concentrated alkaline gas, providing the intermediate degreased body.

[D] Second Degreasing Step

Next, the intermediate degreased body obtained in the intermediate step is carried to the zone 130 by the conveyer 150. Then, the intermediate degreased body is heated while it passes through the zone 130. According to the above, similarly to the first and second embodiments, the second resin 4 and the additive (e.g. the dispersing agent 5) are decomposed and removed from the intermediate degreased body, providing the second degreased body 40 as shown in FIG. 5.

[E] Sintering Step

Next, the second degreased body 40 obtained in the second degreasing step is carried to the zone 140 by the conveyer 150. Then, the second degreased body 40 is heated while passing through the zone 140. According to the above, similarly to the first and second embodiments, the second degreased body 40 is sintered, providing the sintered body 50 as shown in FIG. 6.

In the method for producing a sintered body according to the third embodiment as the above, the same performance and advantages as in the first and second embodiments can also be obtained.

In the above, the method for producing a sintered body and preferred embodiments of the sintered body have been described. However, but the invention is not limited to those embodiments.

For example, arbitrary steps can be also added to the method for producing a sintered body according to need.

EXAMPLES

Specific examples of the invention will now be described.

1. Compact Forming

In the following, a predetermined number of compacts of each sample number were formed.

(Sample No. 1)

SUS316L powder formed by water atomization and polypropylene carbonate (a weight average molecular weight: 50,000) were mixed, and kneaded with a pressure kneader under the following kneading conditions.

An average particle diameter of the SUS316L powder was 10 μm.

The mixing ratio between the powder and other components (a binder and an additive) was 93:7 in weight ratio.

<Kneading Conditions>

Kneading temperature: 200 degrees Celsius

Kneading time: 0.75 hours

Atmosphere: nitrogen gas

The kneaded product was crushed to be a pellet having an average particle diameter of 3 mm. Then injection molding was repeatedly conducted with respect to the pellet with an injection molding machine under the following molding conditions so as to form a predetermined number of compacts of Sample No. 1.

Here, the compact had a cubical shape of 15×15×15 mm. The compact had a through hole of which an inside diameter was 5 mm at the center part of two surfaces facing each other.

<Molding Conditions>

Material temperature: 210 degrees Celsius

Injecting pressure: 10.8 MPa (100 kgf/cm$^2$)

(Samples No. 2 to 10)

A compact of each of Samples No. 2 to 10 was formed in the same manner as Sample No. 1 except for changing a mixing ratio of the components other than the powder and a composition of the binder as shown in Table 1.

(Samples No. 11 and 12)

A compact of each of Samples No. 11 and 12 was formed in the same manner as Sample No. 1 except for changing the composition of the inorganic material powder to zirconia, and setting the mixing ratio between the inorganic material powder and the components other than the inorganic material powder and a composition of the additive as shown in Table 1.

(Samples No. 13 and 14)

A compact of each of Samples No. 13 and 14 was formed in the same manner as Sample No. 1 except for changing the composition of the inorganic material powder to silicon nitride, and setting the mixing ratio between the inorganic material powder and the components other than the inorganic material powder and the composition of the additive as shown in Table 1.

(Samples No. 15 and 16)

A compact of each of Samples No. 15 and 16 was formed in the same manner as Sample No. 1 except for adding no first resin to the binder and setting the composition of the second resin and the additive as shown in Table 1.

TABLE 1

| | | Mixing ratio between inorganic material powder and components other than inorganic material powder (weight ratio) | | Composition and mixing ratio of components other than inorganic material | | | | |
|---|---|---|---|---|---|---|---|---|
| | | | | Binder | | | | |
| | | | | First resin (aliphatic carbonic acid ester based resin) | | Second resin | | |
| Sample No. | Composition of inorganic material powder | Inorganic material powder | Components other than inorganic material powder | Polypropylene carbonate (Mw: 50,000) | Polyethylene carbonate (Mw: 50,000) | Polystyrene (Mw: 10,000) | Polyethylene (Mw: 300,000) | Additive Stearic acid |
| 1 | SUS316L | 93 | 7 | 100 | — | — | — | — |
| 2 | SUS316L | 93 | 7 | — | 100 | — | — | — |
| 3 | SUS316L | 93 | 7 | 75 | 25 | — | — | — |
| 4 | SUS316L | 93 | 7 | 90 | — | 10 | — | — |
| 5 | SUS316L | 93 | 7 | 90 | — | — | 10 | — |
| 6 | SUS316L | 93 | 7 | 90 | — | 5 | 5 | — |
| 7 | SUS316L | 93 | 7 | 90 | — | 9 | — | 1 |
| 8 | SUS316L | 93 | 7 | 50 | — | 50 | — | — |
| 9 | SUS316L | 93 | 7 | 20 | — | 75 | — | 5 |
| 10 | SUS316L | 93 | 7 | 15 | — | 80 | — | 5 |

TABLE 1-continued

| Sample No. | Composition of inorganic material powder | Inorganic material powder | Components other than inorganic material powder | Poly-propylene carbonate (Mw: 50,000) | Poly-ethylene carbonate (Mw: 50,000) | Poly-styrene (Mw: 10,000) | Poly-ethylene (Mw: 300,000) | Additive Stearic acid |
|---|---|---|---|---|---|---|---|---|
| 11 | Zirconia | 84 | 16 | 100 | — | — | — | — |
| 12 | Zirconia | 84 | 16 | 90 | — | 9 | — | 1 |
| 13 | Silicon nitride | 76 | 24 | 100 | — | — | — | — |
| 14 | Silicon nitride | 76 | 24 | 50 | — | 50 | — | — |
| 15 | SUS316L | 93 | 7 | — | — | 95 | — | 5 |
| 16 | SUS316L | 93 | 7 | — | — | 50 | 50 | — |

Sample No. 1 to 14: examples
Sample No. 15, 16: comparative examples
Mw: weight average molecular weight 2. Sintered Body Forming Example 1

A first degreasing step was next conducted with respect to the compact of Sample No. 1 with a continuous furnace as shown in FIG. 7 under the following conditions so as to obtain a degreased body.
<Conditions of First Degreasing Step>
Temperature: 150 degrees Celsius
Time: 6 hours
Atmosphere: nitrogen gas containing ammonia gas (alkaline gas) (concentration of the ammonia gas: 75 vol %)

The degreased body that had been obtained was sintered with the continuous furnace under the following conditions as a sintering step so as to obtain a sintered body.
<Conditions of Sintering Step>
Temperature: 1,350 degrees Celsius
Time: 3 hours
Atmosphere: hydrogen gas (atmospheric pressure)

Examples 2 to 16

A sintered body was obtained in the same manner as Example 1 except for setting a sample number of a compact that was used, conditions of the first degreasing step, and conditions of the sintering step as shown in Table 2, and conducting an intermediate step between the first degreasing step and the sintering step under the following conditions.
<Conditions of Intermediate Step>
Temperature: 100 degrees Celsius (30 degrees Celsius in Example 11)
Time: 1 hour
Atmosphere: nitrogen gas (nitrogen gas containing ammonia gas in Examples 9 and 10)

Examples 17 to 25

A sintered body was obtained in the same manner as Example 5 except for setting a sample number of a compact that was used and conditions of the sintering step as shown in Table 2, and conducting a second degreasing step between the intermediate step and the sintering step under the following conditions.
<Conditions of Second Degreasing Step>
Temperature: 500 degrees Celsius
Time: 1 hour (2 hours in Examples 22 and 23)
Atmosphere: hydrogen gas Example 26

A sintered body was obtained in the same manner as Example 17 except for omitting the intermediate step.

Example 27

A sintered body was obtained in the same manner as Example 17 except for using a continuous furnace as shown in FIG. 8 and setting nitrogen gas that contains ammonia gas and is in a zone for conducting the first degreasing step in the continuous furnace to decrease the concentration of the ammonia gas thereof from 75 vol % to 5 vol % continuously.

Example 28

A sintered body was obtained in the same manner as Example 17 except for using a continuous furnace as shown in FIG. 9; setting nitrogen gas that contains ammonia gas and is in zones for conducting the first degreasing step and the intermediate step in the continuous furnace to decrease the concentration of the ammonia gas from 75 vol % to 5 vol % continuously; and conducting the first degreasing step and the intermediate step sequentially by letting the compact through the zones.

Comparative Example 1

A sintered body was obtained in the same manner as Example 1 except for changing the concentration of ammonia gas to 0 vol % and changing the time for the first degreasing step to 20 hours.

Comparative Example 2

A sintered body was obtained in the same manner as those of Example 1 except for changing the concentration of ammonia gas to 0 vol % and changing the time for the first degreasing step to 80 hours.

Comparative Examples 3 and 4

A sintered body was obtained in the same manner as Comparative Examples 1 and 2 except for conducting the intermediate step between the first degreasing step and the sintering step under the following conditions.
<Conditions of Intermediate Step>
Temperature: 100 degrees Celsius
Time: 1 hour
Atmosphere: nitrogen gas

Comparative Example 5

A sintered body was obtained in the same manner as Example 1 except for changing the atmosphere in the first degreasing step to nitrogen gas containing 1,000 ppm of ozone.

Comparative Examples 6 and 7

A sintered body was obtained in the same manner as Example 17 except for changing the sample number of a compact that was used and the conditions of the second degreasing step as shown in Table 2.

3. Evaluation
3-1. Evaluation on Weight Reduction Rate

A weight reduction rate after the first degreasing step of each of Examples 1 to 28 and Comparative Examples 1 to 7 was measured.

A weight reduction rate after the second degreasing step of each of Examples 17 to 28 and Comparative Examples 6 and 7 was also measured.

The weight reduction rate was measured such that a weight of each work was measured before and after each step with an electronic balance so as to calculate a rate of reduced weight.

Table 2 shows a weight reduction rate calculated in each of the examples and the comparative examples in total degreasing process; a removing rate, calculated from the weight reduction rate, of components (a binder and an additive) other than inorganic material powder; and time required for the total degreasing process.

TABLE 2

| | | Producing conditions First degreasing step | | | |
|---|---|---|---|---|---|
| | Sample No. | Temperature [° C.] | Time [hour] | Atmosphere | Ammonia concentration [vol %] |
| Example 1 | 1 | 150 | 6 | $NH_3/N_2$ | 75 |
| Example 2 | 1 | 150 | 20 | $NH_3/N_2$ | 15 |
| Example 3 | 1 | 150 | 10 | $NH_3/N_2$ | 20 |
| Example 4 | 1 | 150 | 8 | $NH_3/N_2$ | 50 |
| Example 5 | 1 | 150 | 6 | $NH_3/N_2$ | 75 |
| Example 6 | 1 | 150 | 5 | $NH_3/N_2$ | 80 |
| Example 7 | 1 | 150 | 4 | $NH_3/N_2$ | 90 |
| Example 8 | 1 | 150 | 4 | $NH_3/N_2$ | 100 |
| Example 9 | 1 | 150 | 4 | $NH_3/N_2$ | 100 |
| Example 10 | 1 | 150 | 4 | $NH_3/N_2$ | 100 |
| Example 11 | 1 | 50 | 15 | $NH_3/N_2$ | 75 |
| Example 12 | 1 | 190 | 4 | $NH_3/N_2$ | 75 |
| Example 13 | 11 | 150 | 6 | $NH_3/N_2$ | 75 |
| Example 14 | 13 | 150 | 6 | $NH_3/N_2$ | 75 |
| Example 15 | 2 | 150 | 5 | $NH_3/N_2$ | 80 |
| Example 16 | 3 | 150 | 5 | $NH_3/N_2$ | 80 |
| Example 17 | 4 | 150 | 6 | $NH_3/N_2$ | 75 |
| Example 18 | 5 | 150 | 6 | $NH_3/N_2$ | 75 |
| Example 19 | 6 | 150 | 6 | $NH_3/N_2$ | 75 |
| Example 20 | 7 | 150 | 6 | $NH_3/N_2$ | 75 |
| Example 21 | 8 | 150 | 6 | $NH_3/N_2$ | 75 |
| Example 22 | 9 | 150 | 6 | $NH_3/N_2$ | 75 |
| Example 23 | 10 | 150 | 6 | $NH_3/N_2$ | 75 |
| Example 24 | 12 | 150 | 6 | $NH_3/N_2$ | 75 |
| Example 25 | 14 | 150 | 6 | $NH_3/N_2$ | 75 |
| Example 26 | 4 | 150 | 6 | $NH_3/N_2$ | 75 |
| Example 27 | 4 | 150 | 6 | $NH_3/N_2$ | 75→5 |
| Example 28 | 4 | 150 | 6 | $NH_3/N_2$ | 75→0 |
| Comparative Example 1 | 1 | 150 | 20 | $N_2$ | 0 |
| Comparative Example 2 | 1 | 150 | 80 | $N_2$ | 0 |
| Comparative Example 3 | 1 | 150 | 20 | $N_2$ | 0 |
| Comparative Example 4 | 1 | 150 | 80 | $N_2$ | 0 |
| Comparative Example 5 | 1 | 150 | 6 | $O_3/N_2$ | 1000 *1 |

TABLE 2-continued

| | | | | | | |
|---|---|---|---|---|---|---|
| Comparative Example 6 | 15 | 150 | 6 | NH$_3$/N$_2$ | 75 | |
| Comparative Example 7 | 16 | 150 | 6 | NH$_3$/N$_2$ | 75 | |

| | | Producing conditions | | | | | |
|---|---|---|---|---|---|---|---|
| | | Intermediate step | | | | Second degreasing step | |
| | Sample No. | Temperature [° C.] | Time [hour] | Atmosphere | Ammonia concentration [vol %] | Temperature [° C.] | Time [hour] | Atmosphere |
| Example 1 | 1 | — | — | — | — | — | — | — |
| Example 2 | 1 | 100 | 1 | N$_2$ | 0 | — | — | — |
| Example 3 | 1 | 100 | 1 | N$_2$ | 0 | — | — | — |
| Example 4 | 1 | 100 | 1 | N$_2$ | 0 | — | — | — |
| Example 5 | 1 | 100 | 1 | N$_2$ | 0 | — | — | — |
| Example 6 | 1 | 100 | 1 | N$_2$ | 0 | — | — | — |
| Example 7 | 1 | 100 | 1 | N$_2$ | 0 | — | — | — |
| Example 8 | 1 | 100 | 1 | N$_2$ | 0 | — | — | — |
| Example 9 | 1 | 100 | 1 | NH$_3$/N$_2$ | 5 | — | — | — |
| Example 10 | 1 | 100 | 1 | NH$_3$/N$_2$ | 15 | — | — | — |
| Example 11 | 1 | 30 | 1 | N$_2$ | 0 | — | — | — |
| Example 12 | 1 | 100 | 1 | N$_2$ | 0 | — | — | — |
| Example 13 | 11 | 100 | 1 | N$_2$ | 0 | — | — | — |
| Example 14 | 13 | 100 | 1 | N$_2$ | 0 | — | — | — |
| Example 15 | 2 | 100 | 1 | N$_2$ | 0 | — | — | — |
| Example 16 | 3 | 100 | 1 | N$_2$ | 0 | — | — | — |
| Example 17 | 4 | 100 | 1 | N$_2$ | 0 | 500 | 1 | H$_2$ |
| Example 18 | 5 | 100 | 1 | N$_2$ | 0 | 500 | 1 | H$_2$ |
| Example 19 | 6 | 100 | 1 | N$_2$ | 0 | 500 | 1 | H$_2$ |
| Example 20 | 7 | 100 | 1 | N$_2$ | 0 | 500 | 1 | H$_2$ |
| Example 21 | 8 | 100 | 1 | N$_2$ | 0 | 500 | 1 | H$_2$ |
| Example 22 | 9 | 100 | 1 | N$_2$ | 0 | 500 | 2 | H$_2$ |
| Example 23 | 10 | 100 | 1 | N$_2$ | 0 | 500 | 2 | H$_2$ |
| Example 24 | 12 | 100 | 1 | N$_2$ | 0 | 500 | 1 | H$_2$ |
| Example 25 | 14 | 100 | 1 | N$_2$ | 0 | 500 | 1 | H$_2$ |
| Example 26 | 4 | — | — | — | — | 500 | 1 | H$_2$ |
| Example 27 | 4 | 100 | 1 | N$_2$ | 0 | 500 | 1 | H$_2$ |
| Example 28 | 4 | ← | ← | ← | ← | 500 | 1 | H$_2$ |
| Comparative Example 1 | 1 | — | — | — | — | — | — | — |
| Comparative Example 2 | 1 | — | — | — | — | — | — | — |
| Comparative Example 3 | 1 | 100 | 1 | N$_2$ | 0 | — | — | — |
| Comparative Example 4 | 1 | 100 | 1 | N$_2$ | 0 | — | — | — |
| Comparative Example 5 | 1 | — | — | — | — | — | — | — |
| Comparative Example 6 | 15 | 100 | 1 | N$_2$ | 0 | 500 | 5 | H$_2$ |
| Comparative Example 7 | 16 | 100 | 1 | N$_2$ | 0 | 500 | 5 | H$_2$ |

| | | Evaluation results | | | | |
|---|---|---|---|---|---|---|
| | | | | Total degreasing process | | |
| | Sample No. | First degreasing step Weight reduction rate [wt %] | Second degreasing step Weight reduction rate [wt %] | Weight reduction rate [wt %] | Removing rate of components other than inorganic material [wt %] | Required time [hour] |
| Example 1 | 1 | 6.94 | — | 6.94 | 99.1 | 6 |
| Example 2 | 1 | 6.74 | — | 6.74 | 96.3 | 21 |
| Example 3 | 1 | 6.90 | — | 6.90 | 98.6 | 11 |
| Example 4 | 1 | 6.93 | — | 6.93 | 99.0 | 9 |
| Example 5 | 1 | 6.95 | — | 6.95 | 99.3 | 7 |
| Example 6 | 1 | 6.94 | — | 6.94 | 99.1 | 6 |
| Example 7 | 1 | 6.96 | — | 6.96 | 99.4 | 5 |
| Example 8 | 1 | 6.97 | — | 6.97 | 99.6 | 5 |
| Example 9 | 1 | 6.96 | — | 6.96 | 99.4 | 5 |
| Example 10 | 1 | 6.98 | — | 6.98 | 99.7 | 5 |
| Example 11 | 1 | 6.76 | — | 6.76 | 96.6 | 16 |

TABLE 2-continued

|  |  |  |  |  |  |  |
|---|---|---|---|---|---|---|
| Example 12 | 1 | 6.97 | — | 6.97 | 99.6 | 5 |
| Example 13 | 11 | 15.82 | — | 15.82 | 98.9 | 7 |
| Example 14 | 13 | 23.78 | — | 23.78 | 99.1 | 7 |
| Example 15 | 2 | 6.92 | — | 6.92 | 98.9 | 6 |
| Example 16 | 3 | 6.95 | — | 6.95 | 99.3 | 6 |
| Example 17 | 4 | 6.18 | 0.75 | 6.93 | 99.0 | 8 |
| Example 18 | 5 | 6.22 | 0.72 | 6.94 | 99.1 | 8 |
| Example 19 | 6 | 6.23 | 0.70 | 6.93 | 99.0 | 8 |
| Example 20 | 7 | 6.21 | 0.71 | 6.92 | 98.9 | 8 |
| Example 21 | 8 | 3.46 | 3.49 | 6.95 | 99.3 | 8 |
| Example 22 | 9 | 1.39 | 5.54 | 6.93 | 99.0 | 9 |
| Example 23 | 10 | 1.03 | 5.77 | 6.80 | 97.1 | 9 |
| Example 24 | 12 | 14.24 | 1.50 | 15.74 | 98.4 | 8 |
| Example 25 | 14 | 11.85 | 11.75 | 23.60 | 98.3 | 8 |
| Example 26 | 4 | 6.19 | 0.73 | 6.92 | 98.9 | 7 |
| Example 27 | 4 | 6.28 | 0.70 | 6.98 | 99.7 | 8 |
| Example 28 | 4 | 6.27 | 0.69 | 6.96 | 99.4 | 7 |
| Comparative Example 1 | 1 | 0.27 | — | 0.27 | 3.9 | 20 |
| Comparative Example 2 | 1 | 1.10 | — | 1.10 | 15.7 | 80 |
| Comparative Example 3 | 1 | 0.27 | — | 0.27 | 3.9 | 21 |
| Comparative Example 4 | 1 | 1.10 | — | 1.10 | 15.7 | 81 |
| Comparative Example 5 | 1 | 6.63 | — | 6.63 | 94.7 | 6 |
| Comparative Example 6 | 15 | 0.32 | 5.80 | 6.12 | 87.4 | 12 |
| Comparative Example 7 | 16 | 0.55 | 5.90 | 6.45 | 92.1 | 12 |

*1 denotes an ozone concentration (unit: ppm).

As is apparent from Table 2, 95% or more of the binder and the additive was removed in the degreasing process (the first degreasing step and the second degreasing step) of each of the examples. It shows that the degreasing was securely conducted.

In the degreasing process of each of the examples, the degreasing was conducted sufficiently even in a short time, though it changes depending on the composition of the binder, the concentration of ammonia gas in the atmosphere and the temperature of the atmosphere in the first degreasing step, and the like. Thus the time required for the total degreasing process could be reduced. This is because the aliphatic carbonic acid ester based resin was rapidly decomposed and removed and accordingly the second resin was decomposed and removed rapidly.

Further, in a compact containing a binder of which a ratio of aliphatic carbonic acid ester based resin is high, since a decomposition efficiency of the binder was high, the treatment time was largely reduced.

On the other hand, in Comparative Examples 1 to 4 among the comparative examples, the degreasing was insufficient to leave a half or, more amount of binder even though the degreasing was conducted for prolonged periods of time. This is because the atmosphere in the first degreasing step contains no ammonia gas, and accordingly the aliphatic carbonic acid ester based resin was not decomposed and removed to be left in large amounts.

Further, in Comparative Example 5, even though the decomposition of the aliphatic carbonic acid ester based resin progressed due to an acting of ozone, the effect was insufficient.

Further, the compact used in Comparative Examples 6 and 7 contained no aliphatic carbonic acid ester based resin, so that the binder was not sufficiently decomposed under the low temperature of 150 degrees Celsius. Accordingly, even though the second degreasing step was conducted for prolonged periods of time, the degreasing was insufficient.

3-2. Evaluation on Density of Sintered Body

A density of the sintered body obtained in each of the examples and the comparative examples was measured. The density was measured such that densities of 100 of samples were measured by Archimedes method (defined in JIS Z 2505) and each average value was derived as a measured value.

Next, a relative density of the sintered body was calculated from each measured value. The relative density was calculated based on conditions where a relative reference of the density of SUS316L was set to be 7.98 g/cm$^3$ (theoretical density), the same of zirconia was set to be 6.07 g/cm$^3$ (theoretical density), and the same of nitride silicon was set to be 3.30 g/cm$^3$ (theoretical density).

3-3. Evaluation on Dimension of Sintered Body

A dimension in the width direction of the sintered body obtained in each of the examples and the comparative examples was measured so as to evaluate variation of the dimension. The dimension was measured such that dimensions of 100 samples were measured by a micrometer, and variation thereof was calculated.

Next, a circularity of a center hole of each sintered body was measured. The circularity was measured with a three-dimensional measuring device and an average value was calculated.

Since almost all the sintered bodies of Comparative Examples 1 and 3 had cracks, the density and the dimension were not measured.

3-4. Evaluation on Tensile Strength of Sintered Body

A sintered body to be a specimen defined in ISO 2740 was first formed in the same manner as each of the examples and the comparative examples.

Then tensile strength of the specimen was measured in accordance with the testing method defined in JIS Z 2241.

The measured results that were obtained were relatively evaluated in accordance with the following reference.
A: Tensile strength is very large.
B: Tensile strength is large to a certain degree.
C: Tensile strength is small to a certain degree.
D: Tensile strength is very small.

3-5. Evaluation on Aesthetic Appearance of Sintered Body

An aesthetic appearance of the sintered body obtained in each of the examples and the comparative examples was evaluated. The evaluation was performed in accordance with the following reference.
A: There are no sintered bodies having damage and a crack (including a microcrack).
B: There are some sintered bodies having damage and a crack (including a microcrack).
C: There are many sintered bodies having damage and a crack (including a microcrack).
D: Almost all the sintered bodies have a crack.

Table 3 shows the evaluation results of 3-2 to 3-5.

TABLE 3

|  | | Conditions of sintering step | | | |
|---|---|---|---|---|---|
|  | | Temperature | Time | Atmosphere | |
|  | Sample No. | [° C.] | [hour] | Type | Pressure [kPa] |
| Example 1 | 1 | 1350 | 3 | $H_2$ | 100 |
| Example 2 | 1 | 1350 | 3 | $H_2$ | 100 |
| Example 3 | 1 | 1350 | 3 | $H_2$ | 100 |
| Example 4 | 1 | 1350 | 3 | $H_2$ | 100 |
| Example 5 | 1 | 1350 | 3 | $H_2$ | 100 |
| Example 6 | 1 | 1350 | 3 | $H_2$ | 100 |
| Example 7 | 1 | 1350 | 3 | $H_2$ | 100 |
| Example 8 | 1 | 1350 | 3 | $H_2$ | 100 |
| Example 9 | 1 | 1350 | 3 | $H_2$ | 100 |
| Example 10 | 1 | 1350 | 3 | $H_2$ | 100 |
| Example 11 | 1 | 1350 | 3 | $H_2$ | 100 |
| Example 12 | 1 | 1350 | 3 | $H_2$ | 100 |
| Example 13 | 11 | 1450 | 3 | air | 100 |
| Example 14 | 13 | 1700 | 3 | Pressurized nitrogen | 780 |
| Example 15 | 2 | 1350 | 3 | $H_2$ | 100 |
| Example 16 | 3 | 1350 | 3 | $H_2$ | 100 |
| Example 17 | 4 | 1350 | 3 | $H_2$ | 100 |
| Example 18 | 5 | 1350 | 3 | $H_2$ | 100 |
| Example 19 | 6 | 1350 | 3 | $H_2$ | 100 |
| Example 20 | 7 | 1350 | 3 | $H_2$ | 100 |
| Example 21 | 8 | 1350 | 3 | $H_2$ | 100 |
| Example 22 | 9 | 1350 | 3 | $H_2$ | 100 |
| Example 23 | 10 | 1350 | 3 | $H_2$ | 100 |
| Example 24 | 12 | 1450 | 3 | air | 100 |
| Example 25 | 14 | 1700 | 3 | Pressurized nitrogen | 780 |
| Example 26 | 4 | 1350 | 3 | $H_2$ | 100 |
| Example 27 | 4 | 1350 | 3 | $H_2$ | 100 |
| Example 28 | 4 | 1350 | 3 | $H_2$ | 100 |
| Comparative Example 1 | 1 | 1350 | 3 | $H_2$ | 100 |
| Comparative Example 2 | 1 | 1350 | 3 | $H_2$ | 100 |
| Comparative Example 3 | 1 | 1350 | 3 | $H_2$ | 100 |
| Comparative Example 4 | 1 | 1350 | 3 | $H_2$ | 100 |
| Comparative Example 5 | 1 | 1350 | 3 | $H_2$ | 100 |
| Comparative Example 6 | 15 | 1350 | 3 | $H_2$ | 100 |
| Comparative Example 7 | 16 | 1350 | 3 | $H_2$ | 100 |

|  | | Evaluation results of sintered body | | | | | |
|---|---|---|---|---|---|---|---|
|  | | | | Dimensional precision | | | |
|  | | Density | | Width | Through | | |
|  | Sample No. | Measured value [g/cm³] | Relative density [%] | dimension (variation) [mm] | hole circularity [mm] | Tensile strength | Aesthetic appearance |
| Example 1 | 1 | 7.83 | 98 | 0.09 | 0.08 | C | B |
| Example 2 | 1 | 7.72 | 97 | 0.10 | 0.09 | A | A |
| Example 3 | 1 | 7.76 | 97 | 0.06 | 0.05 | A | A |
| Example 4 | 1 | 7.86 | 98 | 0.07 | 0.04 | A | A |
| Example 5 | 1 | 7.90 | 99 | 0.05 | 0.04 | A | A |
| Example 6 | 1 | 7.89 | 99 | 0.05 | 0.03 | A | A |

TABLE 3-continued

| | | | | | | | |
|---|---|---|---|---|---|---|---|
| Example 7 | 1 | 7.92 | 99 | 0.05 | 0.04 | A | A |
| Example 8 | 1 | 7.91 | 99 | 0.04 | 0.04 | A | A |
| Example 9 | 1 | 7.80 | 98 | 0.06 | 0.05 | B | A |
| Example 10 | 1 | 7.72 | 97 | 0.08 | 0.06 | C | B |
| Example 11 | 1 | 7.63 | 96 | 0.10 | 0.09 | C | A |
| Example 12 | 1 | 7.90 | 99 | 0.11 | 0.09 | A | A |
| Example 13 | 11 | 5.91 | 97 | 0.09 | 0.08 | A | A |
| Example 14 | 13 | 3.21 | 97 | 0.08 | 0.07 | A | A |
| Example 15 | 2 | 7.91 | 99 | 0.05 | 0.05 | A | A |
| Example 16 | 3 | 7.90 | 99 | 0.07 | 0.06 | A | A |
| Example 17 | 4 | 7.93 | 99 | 0.04 | 0.04 | A | A |
| Example 18 | 5 | 7.93 | 99 | 0.04 | 0.03 | A | A |
| Example 19 | 6 | 7.94 | 99 | 0.04 | 0.03 | A | A |
| Example 20 | 7 | 7.94 | 99 | 0.04 | 0.03 | A | A |
| Example 21 | 8 | 7.92 | 99 | 0.04 | 0.04 | A | A |
| Example 22 | 9 | 7.84 | 98 | 0.07 | 0.05 | A | A |
| Example 23 | 10 | 7.87 | 99 | 0.16 | 0.11 | A | A |
| Example 24 | 12 | 5.95 | 98 | 0.08 | 0.07 | A | A |
| Example 25 | 14 | 3.25 | 98 | 0.08 | 0.06 | A | A |
| Example 26 | 4 | 7.88 | 99 | 0.06 | 0.06 | A | A |
| Example 27 | 4 | 7.94 | 99 | 0.04 | 0.04 | A | A |
| Example 28 | 4 | 7.92 | 99 | 0.05 | 0.03 | B | A |
| Comparative Example 1 | 1 | — | — | — | — | D | D |
| Comparative Example 2 | 1 | 7.20 | 90 | 0.57 | 0.50 | C | C |
| Comparative Example 3 | 1 | — | — | — | — | D | D |
| Comparative Example 4 | 1 | 7.21 | 90 | 0.61 | 0.49 | C | C |
| Comparative Example 5 | 1 | 7.54 | 94 | 0.10 | 0.09 | C | C |
| Comparative Example 6 | 15 | 7.25 | 91 | 0.32 | 0.29 | C | C |
| Comparative Example 7 | 16 | 7.27 | 91 | 0.33 | 0.28 | C | C |

As is apparent from Table 3, the sintered body that was obtained in each of the examples had a relative density of 96% or more to be a dense body. The sintered body that was obtained in each of the examples had a relatively favorable dimensional precision.

The sintered body that was obtained in each of the examples had an excellent mechanical property (tensile strength) as well. Especially the sintered body formed through the intermediate step had such tendency prominently.

Further, the sintered body that was obtained in each of the examples had an excellent aesthetic appearance.

On the other hand, some sintered bodies that were obtained in the comparable examples had relative densities of less than 95%. It is considered that this is because of the insufficient degreasing due to the reason described above. Further, the binder and the additive that can not be removed due to the insufficient degreasing decompose rapidly in the sintering step to damage the shape of the degreased body (sintered body) or cause a crack on the degreased body. Thus some sintered bodies that were obtained in each of the comparative examples had prominently low dimensional precision or had inferior mechanical property or aesthetic appearance.

What is claimed is:

1. A method for producing a sintered body, comprising:
   a) molding a composition containing a powder primarily made of an inorganic material and a binder including an aliphatic carbonic acid ester based resin in a predetermined shape so as to obtain a compact;
   b) exposing the compact to a first atmosphere containing an alkaline gas and thus decomposing and removing the aliphatic carbonic acid ester based resin from the compact so as to obtain a degreased body;
   c) sintering the degreased body so as to obtain a sintered body; and
   d) exposing the degreased body to a second atmosphere containing a low concentrated alkaline gas whose concentration is lower than a concentration of the alkaline gas of the first atmosphere at least once between step b) and step c),
   wherein the second atmosphere is primarily made of a non-oxygenated gas other than the alkaline gas.

2. The method for producing a sintered body according to claim 1, wherein the alkaline gas is primarily made of an ammonia gas.

3. The method for producing a sintered body according to claim 1, wherein a concentration of the alkaline gas in the first atmosphere is from 20 vol % to 100 vol %.

4. The method for producing a sintered body according to claim 1, wherein a temperature of the first atmosphere is from 50 degrees Celsius to 190 degrees Celsius.

5. The method for producing a sintered body according to claim 1, wherein a number of carbons existing between carbonate ester groups of the aliphatic carbonic acid ester based resin is from 2 to 11.

6. The method for producing a sintered body according to claim 1, wherein the aliphatic carbonic acid ester based resin has no unsaturated bonds in a part except the carbonate ester groups.

7. The method for producing a sintered body according to claim 1, wherein the aliphatic carbonic acid ester based resin has a weight average molecular weight of 10,000 to 300,000.

8. The method for producing a sintered body according to claim 1, wherein a content rate of the aliphatic carbonic acid ester based resin in the binder is 20 wt % or more.

9. The method for producing a sintered body according to claim 1, wherein the second atmosphere practically includes no alkaline gas at least at a final stage of the step d).

10. The method for producing a sintered body according to claim 1, wherein the steps from b) to c) are sequentially conducted with a continuous furnace.

11. The method for producing a sintered body according to claim 10, wherein the continuous furnace is provided with a space that is set to change a concentration of the alkaline gas in a middle of a traveling direction of the compact therein, and the steps from b) to c) are sequentially conducted by allowing the compact to pass through inside of the space.

12. The method for producing a sintered body according to claim 1, wherein the compact is molded by one of an injection molding method and an extrusion molding method.

13. The method for producing a sintered body according to claim 1, including a second degreasing step comprising:

heating the compact so as to decompose and remove a second resin from the compact between step c) and step d), the second resin being included to the binder and having a heat decomposition temperature that is higher than a melting point of the aliphatic carbonic acid ester based resin.

14. The method for producing a sintered body according to claim 13, wherein an atmosphere in the second degreasing step primarily contains a reducing gas.

15. The method for producing a sintered body according to claim 13, wherein a heating temperature in the second degreasing step is from 190 degrees Celsius to 600 degrees Celsius.

16. The method for producing a sintered body according to claim 13, wherein the second resin is primarily made of at least one of polystyrene and polyolefin.

17. A method for producing a sintered body, comprising:
a) molding a composition containing a powder primarily made of an inorganic material and a binder including an aliphatic carbonic acid ester based resin in a predetermined shape so as to obtain a compact;
b) exposing the compact to a first atmosphere containing an alkaline gas and thus decomposing and removing the aliphatic carbonic acid ester based resin from the compact so as to obtain a degreased body;
c) sintering the degreased body so as to obtain a sintered body; and
d) exposing the degreased body to a second atmosphere containing a low concentrated alkaline gas whose concentration is lower than a concentration of the alkaline gas of the first atmosphere at least once between step b) and step c),
wherein a temperature of the second atmosphere is lower than a temperature of the first atmosphere.

* * * * *